(12) United States Patent
Lunt et al.

(10) Patent No.: US 7,359,330 B2
(45) Date of Patent: Apr. 15, 2008

(54) FAULT LOCATION ON A TELECOMMUNICATIONS NETWORK

(75) Inventors: Nicholas Lunt, Ipswich (GB); Hilary P Logan, Ipswich (GB); Andrew D Chattell, Ipswich (GB)

(73) Assignee: British Telecommunications public limited company, London (GB)

( * ) Notice: Subject to any disclaimer, the term of this patent is extended or adjusted under 35 U.S.C. 154(b) by 928 days.

(21) Appl. No.: 10/220,430

(22) PCT Filed: Mar. 5, 2001

(86) PCT No.: PCT/GB01/00952

§ 371 (c)(1),
(2), (4) Date: Sep. 3, 2002

(87) PCT Pub. No.: WO01/26208

PCT Pub. Date: Oct. 11, 2001

(65) Prior Publication Data
US 2003/0067881 A1  Apr. 10, 2003

(30) Foreign Application Priority Data
Mar. 31, 2000 (GB) .................. 0007835.2

(51) Int. Cl.
*G01R 31/08* (2006.01)
(52) U.S. Cl. .............. 370/244; 370/248; 370/252; 379/26.01
(58) Field of Classification Search ........... 379/22.03, 379/25, 24, 27.01; 370/242, 248; 324/519, 324/658, 525, 659, 665, 666, 669
See application file for complete search history.

(56) References Cited

U.S. PATENT DOCUMENTS 5,699,402 A * 12/1997 Bauer et al. ............. 379/29.09

(Continued)

FOREIGN PATENT DOCUMENTS

WO  WO 96/10890  4/1996

(Continued)

OTHER PUBLICATIONS

International Search Report dated Aug. 1, 2001.

(Continued)

*Primary Examiner*—Ricky Q. Ngo
*Assistant Examiner*—Dady Chery
(74) *Attorney, Agent, or Firm*—Nixon & Vanderhye P.C.

(57) ABSTRACT

A fault location system for a telecommunications network including a local exchange or switch, a node such as a primary connection point and a plurality of line terminations includes probability calculation to establish the location of a fault measured from the exchange. Historical non-faulty reference values of capacitance are compiled for each line passing through the node providing a measure of the distance of each line. A lowest valid capacitance value provides an estimate of the reference capacitance between the exchange and the node. A histogram is compiled of historic fault values and a new fault is compared against the histogram to establish the probability of it being a fault at the node or elsewhere. As a result the reference capacitance can be obtained without the need for an engineer at the node, and the likely location of a fault can be pinpointed with greater accuracy.

9 Claims, 10 Drawing Sheets

U.S. PATENT DOCUMENTS 5,870,451 A 2/1999 Winkler et al.
6,008,654 A 12/1999 Chaskell
6,252,852 B1 * 6/2001 Rowles et al. .............. 370/242

FOREIGN PATENT DOCUMENTS

WO WO9719544 * 5/1997
WO WO 98/21869 5/1998

OTHER PUBLICATIONS

International Preliminary Examination Report dated Jul. 31, 2002.

* cited by examiner

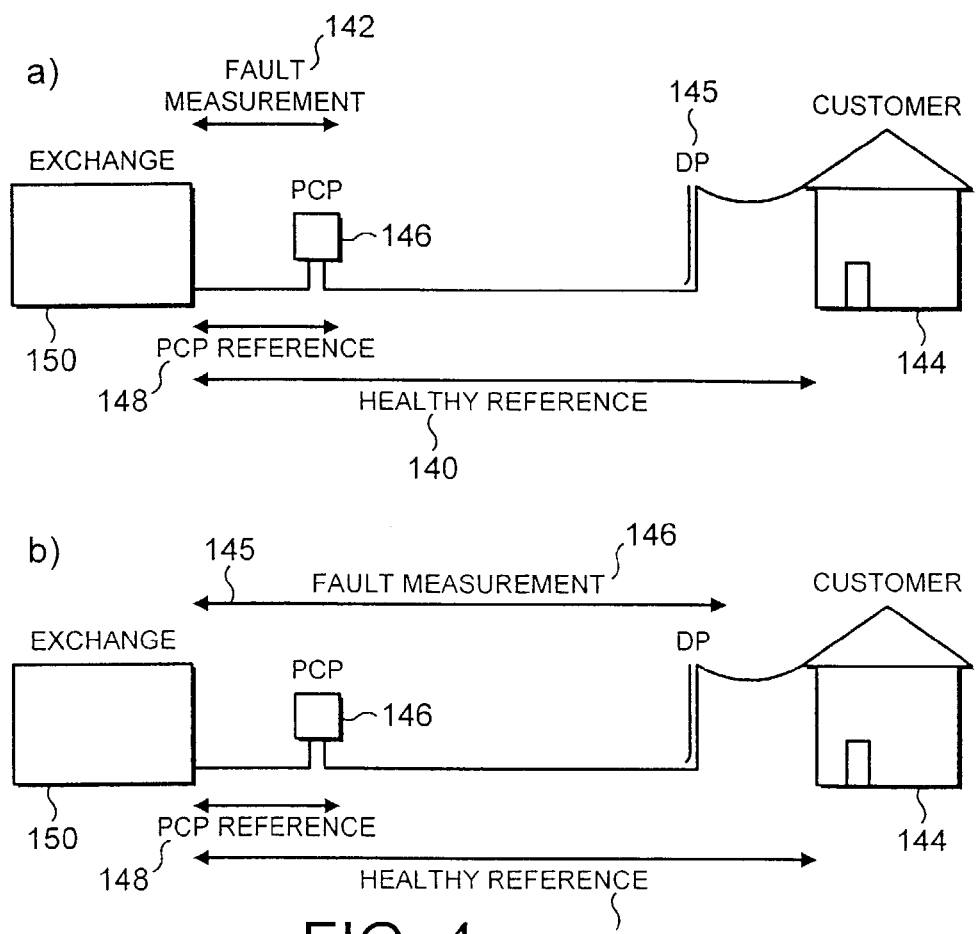
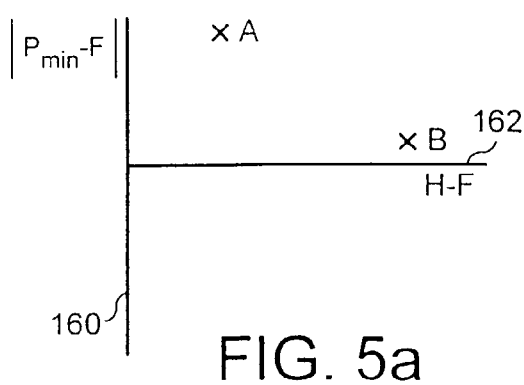
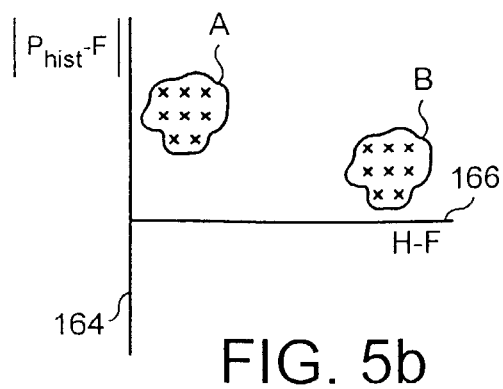
FIG. 4
FIG. 5a
FIG. 5b

FAULT LOCATION ON A TELECOMMUNICATIONS NETWORK

This application is the US national phase of international application PCT/GB01/00952 filed 5 Mar. 2001 which designated the U.S.

BACKGROUND

1. Technical Field

The invention relates to a method of locating faults on a telecommunications network, a method of compiling a distribution of historic parameter values for such a method, and a fault locating system.

2. Related Art

A conventional public telecommunications network comprises a relatively small number of interconnected main switches and a larger number of local switches, each of which is connected to one or two main switches. The local switches are connected to the terminating lines of the network and the far ends of these lines are connected to terminal equipment such as telephone instruments provided for users of the network.

The network formed from the main switches and local switches is known as the core network, while the network formed from the terminating lines is known variously as an access network or a local loop. Some terminating lines are connected to a remote concentrator, which may or may not have switching capabilities. The remote concentrator is then connected to a local switch. The term local switch when used herein covers both local switches and remote concentrators.

In a conventional access network, each terminating line is formed from a pair of copper wires. Typically, each copper wire passes through a series of nodes between the local switch and terminal equipment. Examples of such nodes are primary cross-connection points (PCP), secondary cross-connection points (SCP), distribution points (DP) and junctions.

Terminating lines are prone to faults such as dis-connections, short circuits between the two wires of the pair of wires, and short circuits between one of the wires and earth. Causes of such faults include ingress of water into a node and also physical damage to a node.

Disconnection faults occur frequently; 30-40% of all logged faults are disconnection faults and 25% are at the PCP making these the most common kind of disconnection fault. According to known systems, the engineer is sent to the PCP to establish whether the fault is there or in the vicinity which may be as little as a street or two away. However it is desired to be able to identify within a reasonable level of accuracy whether the fault is actually at the PCP or, for example, with the customer, in order to reduce the engineer time spent on locating the fault.

Local switches are provided with line testing apparatus which may be used to test its terminating lines. When a customer reports a fault on a terminating line, the line may then be tested to identify the fault condition.

The process of locating, evaluating and repairing a fault may involve a comparison between the fault value with a reference capacitance which is the capacitance of a line under normal conditions between a node, such as a PCP, and the local switch.

Conventionally, it has been necessary for a person to travel to a node to test the node. Simultaneously, it is necessary to test the line from the local switch. This procedure suffers from several disadvantages. Firstly, as it is necessary to send a person to the node to measure a capacitance reference value, two people are needed to complete the measurements—one at the node and a person at the local switch. The procedure itself is labour intensive, and time consuming. Also, because it is also necessary to test several nodes before the correct one is found, the problems of cost and time are exacerbated. Known systems are described in published patent applications EP 0862828 and EP 0938800.

According to one known system, the location of the fault is then estimated using an expert system assigning scores based on a range of parameters. This system requires complex processing of data on site. In addition, where there is more than one line running to the PCP, or cabinet, a single reference value may not be representative if there is re-routing or if a line between the switch and exchange follows an alternative route where there are multiple lines.

BRIEF SUMMARY

According to the invention there is provided a method of locating faults on a telecommunications network including a switch and a plurality of terminating lines extending from the switch, comprising the steps of:

measuring a parameter of a line having a fault, comparing the fault line parameter value against a distribution of historical parameter values, and identifying the probable fault location from the comparison. As a result previous recorded values can be used as a basis for identifying the new fault location from the switch.

Each distribution location preferably includes the total number of historical faults and the number of historical faults at the predetermined point on the network for the distribution location, allowing a simple calculation of the possibility of the new fault being at the predetermined point, for example the node location, such as the PCP.

Preferably if the probability represented by a distribution location is derived from an unrepresentative sample, the fault line parameter is further compared against probabilities represented by one or more adjacent distribution locations. Accordingly the calculation can spread along the distribution until a representative sample is achieved. The distribution preferably comprises at least one axis comprising a comparison of historical fault line parameter values and corresponding historical non-fault line parameter values, for example a first axis comprising a comparison of historical fault line parameter values and corresponding historical healthy line values, and a second axis comprising a comparison of historical fault line parameter values and a value representative of the switch to node parameter value, and/or a first axis comprising a comparison of historical fault line parameter values and corresponding healthy line parameter values, and a second axis comprising a comparison of historical fault line parameter values and the historical switch to node parameter value closest to the fault line parameter value. The offset for the switch to node parameter is thus compensated, and errors in an average value can be mitigated for that parameter.

The invention further provides a method of compiling a distribution of historical parameter values for the above described method, obtaining historical values, and sorting said values into bins.

The invention further provides a fault locating system for a telecommunications network including a switch and a plurality of terminating lines extending from the switch, the system including:

means for measuring a parameter of a line having a fault, means for comparing the fault line parameter against a distribution of historical parameter values, means for identifying the probable fault location from the comparison, and a fault management system including such a fault locating system.

BRIEF DESCRIPTION OF THE DRAWINGS

The present invention may be put into practice in several ways. A specific embodiment will now be described by way of example with reference to the accompanying drawings, in which:

FIG. 4 is a diagrammatic representation of a telecommunications network;

FIG. 5A shows two sample values on a PCP reference histogram;

FIG. 5B shows multiple bin values on a PCP historic reference histogram;

DETAILED DESCRIPTION OF EXEMPLARY EMBODIMENTS

The fault location system and method of the present invention comprises two basic operations. The system provides an arrangement capable of finding the likely location of a fault in a telecommunications system effectively by comparing a test measurement on a line with a reference value and deriving from that comparison the likely location of the fault. Accordingly, the two operations are respectively obtaining one or more reference values to form the basis of the comparison, and carrying out the comparison itself.

Figure 1:
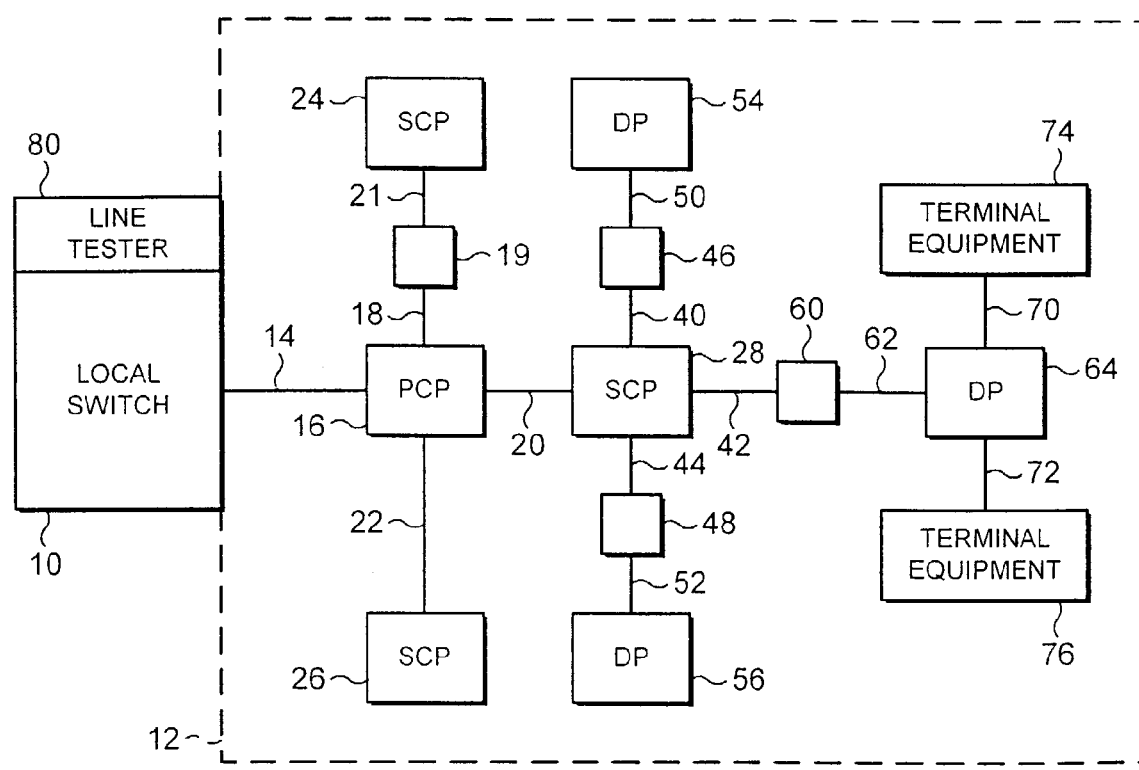
FIG. 1 is a block diagram of an access network and an associated local switch which form part of a telecommunications network according to the prior art.

FIG. 1 illustrates an access network 12 of a conventional telecommunications network connected to a local switch 10. The local switch 10 and the access network 12 form part of a telecommunications network.

The local switch 10 is connected to the terminating line of the access network 12. Typically, a local switch is connected to several thousand terminating lines. Each terminating line passes through several nodes before reaching its respective terminal equipment. These nodes comprise primary cross-connection points (PCP), secondary cross-connection points (SCP), distribution points (DP) and junctions.

Each terminating line is typically formed from a pair of copper wires. The copper wires leave the local switch 10 in the form of one or more cables. One of these cables is shown in FIG. 1 and is indicated by reference numeral 14. The far end of cable 14 from switch 10 is connected to a PCP 16 which may be housed in a street cabinet or underground junction box. From the PCP 16 the terminating lines branch out as cables in several directions. For simplicity, in FIG. 1 there are shown only three cables 18, 20 and 22. The far end of cable 18 is connected to a joint 19. The joint 19 is connected by cable 21 to a SCP 24. The far ends of cable 20 and 22 are connected to, respectively, SCP 26 and 28. For reasons of simplicity, the continuation of the terminating lines beyond SCP 24 and 26 is not shown. The SCP 24, 26 and 28 are housed in junction boxes which may be located above or below ground.

For the SCP 28, the terminating lines branch out again in several directions in the form of cables. By way of illustration, FIG. 1 shows cables 40, 42 and 44 leaving the SCP 28. Cables 40 and 44 are connected, respectively, to joints 46 and 48. Joints 46 and 48 are connected, respectively, to cables 50 and 52, the far ends of which are connected to distribution points 54 and 56.

The far end of cable 42 is connected to joint 60. The joint 60 is connected by cable 62 to a distribution point 64. For reasons of simplicity, the terminating lines beyond distribution points 54 and 56 are not shown.

Distribution points are implemented as junction boxes which are typically located on telephone poles or can be internal or underground. For each distribution point, the terminating lines branch out as single copper cable pairs to where terminal equipment provided for a user of the network is located. By way of illustration, FIG. 1 shows two single copper cable pairs 70, 72 leaving the distribution point 64. The far ends of cables 70 and 72 are connected, respectively, to terminal equipment 74, 76. The terminal equipment take various forms, for example, a public telephone located in a public telephone box, a telephone instrument located in a house or office, or a fax machine or computer located in a customer's premises.

In the example shown in FIG. 1, each of the joints 19, 46, 48 and 60 are used to connect the cables together. Joints may also be used to connect two or more smaller cables to a large cable.

The cable 14 is housed in a duct in which the air is kept at a pressure above ambient pressure.

In each terminating line, the two wires of each pair are designated as the A leg and B leg. At the local switch 10, in order to supply current to the line, a bias voltage (sometimes termed a "battery" voltage) of 50 V is applied between the A leg and B leg. In the terminal equipment, the A leg and B leg are connected by a capacitor, the presence of which may be detected when the terminal equipment is not in use.

The terminating lines in the access network are prone to faults. The main cause of these faults are ingress of water and physical damage to the nodes through which the terminating lines pass between the local switch 10 and terminal equipment. There are five main faults which occur due to causes arising in the nodes. These faults are disconnection, short circuit, faulty battery voltage, earthing faults and low insulation resistance. A disconnection arises where a terminating line is interrupted between the local switch and the terminal equipment. A short circuit arises where the A leg and B leg of a line are connected together. A faulty battery voltage arises where the A leg or the B leg of a terminating line has a short circuit connection to one of the wires of another line. An earthing fault arises when the A leg or the B leg is connected to earth. Low insulation resistance arises where the resistance in the cable between the A leg or the B leg or between one of the legs and earth is below an acceptable value.

When a line is tested, the leg to earth capacitance returned is generally directly proportional to the length of that line. Hence, if a disconnection fault occurs on a leg, a reduction in the leg to earth capacitance for that leg occurs compared to a non-faulty or "healthy" measurement.

The line testing equipment itself is well known to the skilled person and is available commercially. For example, a suitable line tester for a switch is available from Porta Systems of Coventry, England. Similarly, measurement systems based on capacitance values from line tests are well known, for example the Vanderhoff measurement system and the Teradyne line tester from Teradyne Limited of Western Centre, Western Gate, Bracknell RG12 1RW, England.

Turning now to the fault location method and system of the present invention, it is first of all necessary to obtain a reference value parameter against which values from line tests can be compared as discussed in more detail below. In the present instance, the reference value used is the healthy capacitance reference from the exchange (local switch 10) to the PCP. It will be appreciated that this is not a fixed value for all switches and PCP's but is dependent on physical attributes of the network.

There can be several different cables running from the switch to a node, such as a single PCP. These e-side (exchange side) cables do not necessarily follow the same physical route from the switch to the PCP. Hence, the physical length of the e-side cables can differ resulting in some lines with similar d-side (distribution side) routing having very different electrical characteristics.

Also, it is assumed that the lines in a particular cable can be routed anywhere on the d-side of a node, such as a PCP. It follows from this assumption that an approximation of the switch to PCP capacitance for the shortest e-side cable can be extracted from examining all of the healthy capacitance references of the lines routed through the PCP.

One hypothetical but very direct way of obtaining a healthy line reference value would simply be to obtain a capacitance value for a line to a telephone at the PCP, or to a line deliberately disconnected at the PCP and hence terminating there. Either of these approaches would, in theory, given the exact value of the capacitance of the line between the switch and the PCP. However, these approaches give rise to various problems. First of all, such measurements would be based on a measurement of one e-side line, i.e., a single pair on a single cable. This may not be representative of an appropriate reference value where multiple lines are routed from the switch of the PCP. In particular, the single measurement might not represent the majority of the lines available. Furthermore, not all PCP's (or cabs) have cab phones and hence this approach could not be used universally. On the other hand, deliberately disconnecting a line at each PCP would be highly time consuming. As a result, a reference value measurement system that can be controlled from the switch and which is representative of the physical realities of the network is required.

The basic approach taken according to this aspect of the invention is to obtain healthy line references from line test data from all or a representative number of lines on the PCP. Of those values, based on the rule adopted that line length is directly in proportion to capacitance, the lowest value of capacitance will correspond to those lines terminating nearest the PCP and hence will provide a close approximation of the PCP reference value. The preferred method is discussed in more detail below with particular reference to identifying healthy line values, a representative sample of measurements and excluding any after effects.

According to one embodiment of the present invention, the first step in estimating the reference capacitance for a line between a node, here the PCP, and the local switch is to obtain healthy line references from line test data for all lines, taken over a predetermined time, for example 10 days. The measurements are preferably taken overnight. Some lines may not necessarily be tested each day for the whole of the period.

In the first instance, the results are restricted to representative line test data. All reports are assigned a code following standard procedure (a termination statement) and tests associated with faulty lines are ignored. Other parameters are measured beyond the capacitance, one of which is line resistance and tests associated with a resistance value less than 1 MΩ are also disregarded. This minimum value is introduced because of possible inaccuracies of capacitance values obtained when lines are tested when resistance of the lines falls below some critical level. In practice it may be possible to relax the level, for example, 100 kΩ without impairing the accuracy of the system.

Occasionally, rogue capacitance readings occur which bias the results. In order to overcome this problem, the average and standard deviations of the A and B leg to earth resistance values over this period are calculated. Only lines with individual leg to earth standard deviations of less than a predetermined value, in this embodiment 10 nf, are considered as potential healthy reference values.

Following this initial filter, the remaining lines are examined to see if they balance, that is to establish that the leg to earth capacitance measurement of each leg of the pair are close enough together, in the preferred embodiment, within 80% of each other. This balance requirement is necessary as the healthy reference value is a single value that is the average of the A leg and B leg to earth capacitance values, as discussed below.

In summary, the healthy references for each line which are demoted H below are determined from averages of the leg to earth capacitance from
 a predetermined period of time, in this case 10 days
 termination statement is such that the customer equipment or master jack is detected
 balanced, steady lines with resistance measurements>1 MΩ
 lines with standard deviations of individual leg to earth capacitance less than 10 nf As will be discussed in more detail below in the specification in relation to the second part of the operation, a healthy reference value is set up and stored for as many lines as possible as subsequent fault detection is based upon that value.

One further source of artifact originates from lines having special characteristics such as digital DACS lines, WB900 and ISDN2. These give capacitance readings that are independent of the length of the actual line. For example, in the example of DACS these lines return a predefined set of test results irrespective of the length of the line. As discussed in more detail below, a further exclusion relates to values returned from lines having these special characteristics.

Figure 2A:
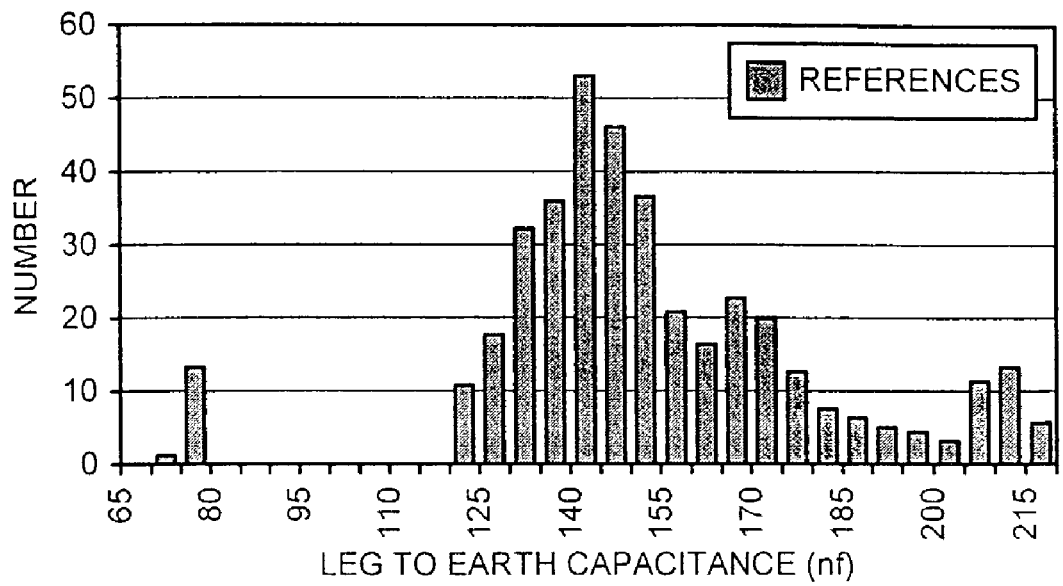
FIGS. 2A and 2B are histograms of healthy capacitances for lines through a node constructed according to the method of the present invention.
Figure 2B:
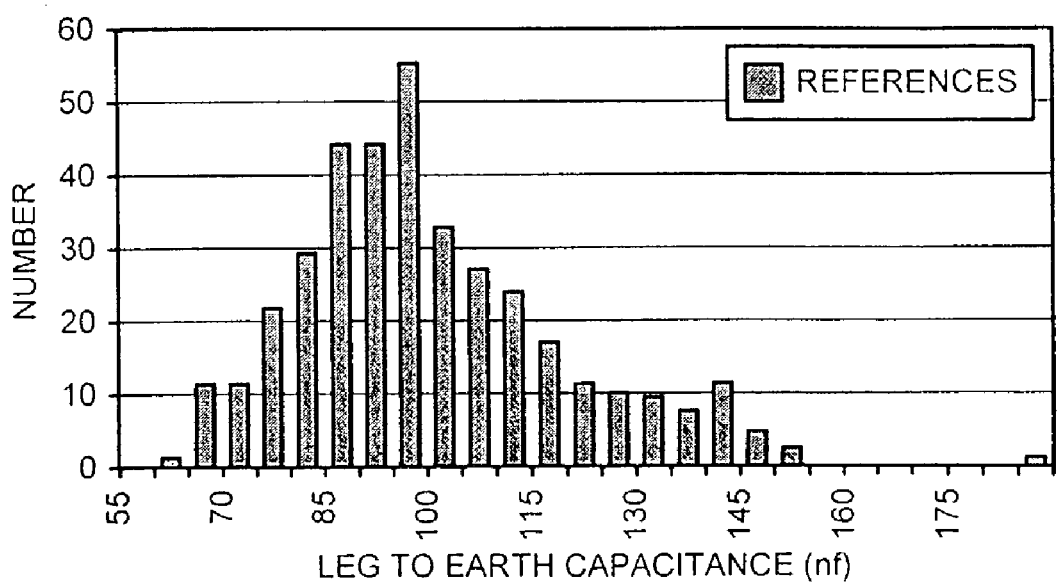

The healthy reference values retained are, in the preferred embodiment, presented in the form of a histogram as shown in FIGS. 2A and 2B. As discussed above, it is assumed that the lines in a particular cable can be routed anywhere on a d-side of a PCP. It follows that an approximation of the exchange to PCP capacitance with the shortest e-side cable can be extracted by examining all of the healthy capacitance reference lines routed through the PCP. Referring to FIG. 2A, the lowest leg to earth capacitance value (disregarding artifacts) is selected as representative of a healthy PCP reference value.

The algorithms and resultant histograms are now discussed in more detail with reference to FIG. 3 and Tables 1 to 6.

Table 1 lists exemplary user definable parameters and possible values for the preparation of healthy line references.

The parameters are "global" in the sense that they are applicable to all regions.

TABLE 1

| Parameter Code | Parameter of Description | Units | Possible range to set parameter | Suggested value |
|---|---|---|---|---|
| P1_1 | Minimum number of routing measurements | — | Greater than 0 to less than P1_2 | 10 |
| P1_2 | Maximum number of routing measurements | — | P1_1 to 30 | 20 |
| P1_3 | Minimum healthy A leg to B leg resistance threshold | Ohms | 0 to 999999 | 999999 |
| P1_4 | Minimum healthy A leg to Earth resistance threshold | Ohms | 0 to 999999 | 999999 |
| P1_5 | Minimum healthy A leg to battery resistance threshold | Ohms | 0 to 999999 | 999999 |
| P1_6 | Minimum healthy B leg to A leg resistance threshold | Ohms | 0 to 999999 | 999999 |
| P1_7 | Minimum healthy B leg to Earth resistance threshold | Ohms | 0 to 999999 | 999999 |
| P1_8 | Minimum healthy B leg to battery resistance threshold | Ohms | 0 to 999999 | 999999 |
| P1_9 | Healthy Termination Condition | — | List of allowed termination statements | IF Vanderhoff system, THEN P1_12 = EITHER 1 or 3 IF Teradyne system, THEN P1_12 = 7 |
| P1_10 | Minimum number of healthy measurements | — | 1 to P1_1 | 1 |
| P1_11 | Balance condition | — | 0 to 1 | 0.8 |
| P1_12 | Steady condition | Nano Farads | 0 to 00 | 10 |

Routing information for the area to be investigated is also required for the purposes of associating a reference value with a line. Table 2 gives the data fields needed for each line.

TABLE 2

| Code | Data Field Name | Description |
|---|---|---|
| L_CIRC | CIRCUIT_ID | Identifies the line |
| L_TYPE | DP_NED_TYPE | Type or service (null to avoid DACS, etc) |
| L_PCP | PCP_EO_NUMBER | Identification number for PCP for the line |
| L-DIST | DISTRICT_ID | District identification code |
| L-EXCH | EXCHANGE_CODE | Exchange identification code |

A PCP is uniquely identified be three pieces of routing information, described in Table 2, L_DIST, L_EXCH and L_PCP.

Only lines with "known routing" are used. A line is said to have known routing when the following conditions are met:

L_CIRC has an entry;

AND L_LINENO has not got an entry or is one;

AND L_TYPE is not one of the excluded types of service, e.g. DACS;

AND L_PCP has an entry;

AND L_DIST has an entry;

AND L_EXCH has an entry.

Additional local network routing information is given in Table 3 necessitated as L_CIRC can have two components—a directory number and a line number.

TABLE 3

| Code | Data Field Name | Description |
|---|---|---|
| L_DIRNO | DIRECTORYNUMBER | Directory number for the line |
| L_LINENO | LINENUMBER | Number of the line on the directory |

The excluded types of service are lines that have certain characteristics (L_TYPE). As discussed above, an example is a DACS line (digital access carrier system), which gives a capacitance reading independent of the length of the actual line. Other examples are WB 900 (a model number of an analogue gain system) and an ISDN (integrated service digital network).

To produce healthy line references, between P1_1 and P2_2 routing measurements taken on different days during a continuous P1_2 day period, are collected for lines with known routing. The night routing data fields are described in Table 4.

TABLE 4

| Code | Data Field Name | Description |
|---|---|---|
| R_DIRNO | DIRECTORYNUMBER | Directory number for the line |
| R_LINENO | LINENUMBER | Number of the line on the directory number |
| R_RESAB | RESISTACEAB | Resistance value, used to check if line healthy, A-B leg |
| R_RESAE | RESISTANCEAE | Resistance value, used to check if line healthy, A-Earth |
| R_RESABAT | RESISTANCEATOBATT | Resistance value, used to check if line healthy, A-Battery |
| R_RESBA | RESISTANCEBA | Resistance value, used to check if line healthy, B-A leg |
| R_RESBE | RESISTANCEBE | Resistance value, used to check if line healthy, B-Earth |
| R_RESBBAT | RESISTANCEBTOBATT | Resistance value, used to check if line healthy, B-Battery |
| R_CAPAE | CAPACITANCEAE | Capacitance, A leg to Earth |
| R_CAPBE | CAPACITANCEBE | Capacitance, B leg to Earth |
| R_TERM | TERMSTATEMENT | AFM termination statement, used to check if line is healthy |

Line test data is considered as healthy data if it satisfies the following requirements:

R_RESAB>P1_3

AND R_RESAE>P1_4

AND R_RESABAT>P1_5

AND R_RESBA>P1_6

AND R_RESBE>P1_7

AND R_RESBBAT>P1_8

AND R_TERM IN LIST P1_9

Accordingly, all resistance values (leg to earth, leg to battery/bias voltage and to loop of each pair) are tested against the 1 MΩ threshold value.

It will be seen that a final test is to establish that a "healthy line" as identified (R_TERM). The relevant value depends on the test system, either the Vanderhoff system, or the Teradyne test system.

Also, any line test data associated with a fault report were ignored.

In order to implement the step of assembling and implementing standard deviation values for the capacitance for each of the lines with known routing, the number n of healthy data measurements is counted. If n is greater than or equal to a minimum P1_10, then the following are calculated:

$$AV\_CAPAE = \sum_{i=1}^{n} \frac{(R\_CAPAE)_i}{n}$$

(The Average of the R_CAPAE measurements)

$$SD\_CAPAE = \sqrt{\sum_{i=1}^{n} \frac{((((R\_CAPAE)_i - AV\_CAPAE))))^2}{n-1}}$$

(The standard deviation of the R_CAPAE measurements, if n=1 then SD_CAPAE=0)

$$AV\_CAPBE = \sum_{i=1}^{n} \frac{(R\_CAPBE)_i}{n}$$

(The average of the R_CAPBE measurements)

$$SD\_CAPBE = \sqrt{\sum_{i=1}^{n} \frac{((((R\_CAPBE)_i - AV\_CAPBE))))^2}{n-1}}$$

(The standard deviation of the R_CAPBE measurements, if n=1 then SD_CAPBE=0)

To see if the remaining lines are "balanced", we assess:

If AV_CAPAE>P1_11×AV_CAPBE

AND AV_CAPBE>P1_11×AV_CAPAE

If this condition is satisfied, then the line is balanced. For this embodiment with the suggested values used, the balance condition was such that the average A and B leg to earth capacitance value are within 80% of each other (i.e. average A leg to earth>0.8×average B leg to earth and average A leg to earth<1.25×average B leg to earth). Accordingly, as discussed above, a single representative average value is obtained.

Lines that are not balanced are not included in the calculations further.

To complete the assessment, the following is calculated:

If SD_CAPAE<P1_12

AND SD_CAPBE<P1_12

If this condition is fulfilled, then the line is considered to be "steady" as the deviation is within a preset range. Lines that are not steady are similarly not considered further.

For balanced and steady lines, a healthy reference for the line is given by $$H = \frac{AV\_CAPAE + AV\_CAPBE}{2}$$

Having established a value of H for each line that has not been disregarded for one of reasons set out above, a histogram of the type shown in FIG. 2 is compiled. FIGS. 2A and 2B show histograms for two different PCPs, highlighting the significant differences that occur as physical conditions alter. The histogram values are entered in "bins" of a predetermined width, the height of the bin indicating the number of values within the range defined by the bin width. For example, with a bin width of 5 nf, a bin spanning 125 to 130 nf and having a value of 10 indicates that 10 lines registered capacitance values in that range.

Table 5 lists user definable parameters and suggested values for the preparation of the histogram.

TABLE 5

| Parameter Code | Parameter Description | Units | Possible range to set parameter | Suggested value |
|---|---|---|---|---|
| P2_1 | Histogram bin width | Nano Farads | Greater than 0 | 5 |
| P2_2 | First run, number of consecutively filled bins | — | 3 or more | 5 |

For each PCP being considered, for all the lines that are routed through the PCP that have an associated H value, the following is calculated.

Min_Health=minimum ($H_1 H_2 \ldots H_N$)

Max_Health=maximum ($H_1 H_2 \ldots H_N$)

where N is the number of lines routed through the PCP under investigation that have an associated H value.

Then, Min_Bin and Max_Bin are calculated, where $$\text{Min\_Bin} = \left(\text{truncate}\left(\frac{\text{Min\_Health}}{P2\_1}\right)\right) \times P2\_1$$

$$\text{Max\_Bin} = \left(\text{truncate}\left(\frac{\text{Max\_Health}}{P2\_1}\right) + 1\right) \times P2\_1$$

$$\text{No\_Bins} = \frac{(\text{Max\_Bin} - \text{Min\_Bin})}{P2\_1}$$

The N values of H for the lines routed through the PCP are sorted into a number of bins. A bin is a count of the number of lines with H values in the range defined by H>=lower_range for the bin AND H<upper_range for the bin Hence, each bin has an associated upper and lower capacitance value.

The lower_range and upper_range values for the bins dependent on the bin width P2_1 are given by the following expressions lower_range$_a$=Min_Bin+a×(P2$_{\_b\ 1}$)

upper_range$_a$=Min_Bin+((a+1)×P2__1)

where a is an integer from 0 to (No_Bins−1)

The number of lines, count_lines$_a$ in each of the No_Bins bins, is given by the expression count_lines$_a$=number of lines with H>=lower_range$_a$ AND H<upper_range$_a$ This creates a histogram of the H values for the lines routed through the PCP.

Examples of two histograms for PCP's in one area are shown in FIGS. 2A and 2B. The histograms have a 5 nf bin width, with individual bin start and stop values being multiples of five and the range of bin values being such that all the healthy reference values for the lines routed through the PCP's fit into a bin. As discussed above, it is not possible to proceed to estimate capacitance values for the local switch to PCP merely from the minimum average healthy leg to earth capacitance values for all the lines routed through the PCP. This is because outlying, low capacitance values arise. Some of these are due to unknown DACS lines, others are due to lines re-routed or re-allocated since the creation of routing tables used in the analysis.

The outlying points are removed by finding the minimum of a distribution of the healthy reference values for the PCP from the histograms.

It is then necessary to identify the reference capacitance value for the switch to PCP line, by identifying the lowest valid value. In the preferred embodiment, to assess the valid minimum of the distribution, the lowest value bin is identified, scanning upwards from Onf, that has at least P2_2 adjacent bins that contain data. The bin value lowest in this range is taken as the switch to PCP capacitance reference. If no such range of adjacent bins is found, the process must be repeated looking for (P2_2)−1 adjacent bins.

For example, in FIG. 2A. the minimum distribution occurs at 120 nf. Lower values are not part of the main distribution, and are attributable to DACS and are included to illustrate the point that DACS lines are noticeably different to other lines. In FIG. 2B, the minimum of the distribution occurs at 60 nf.

Figure 3:
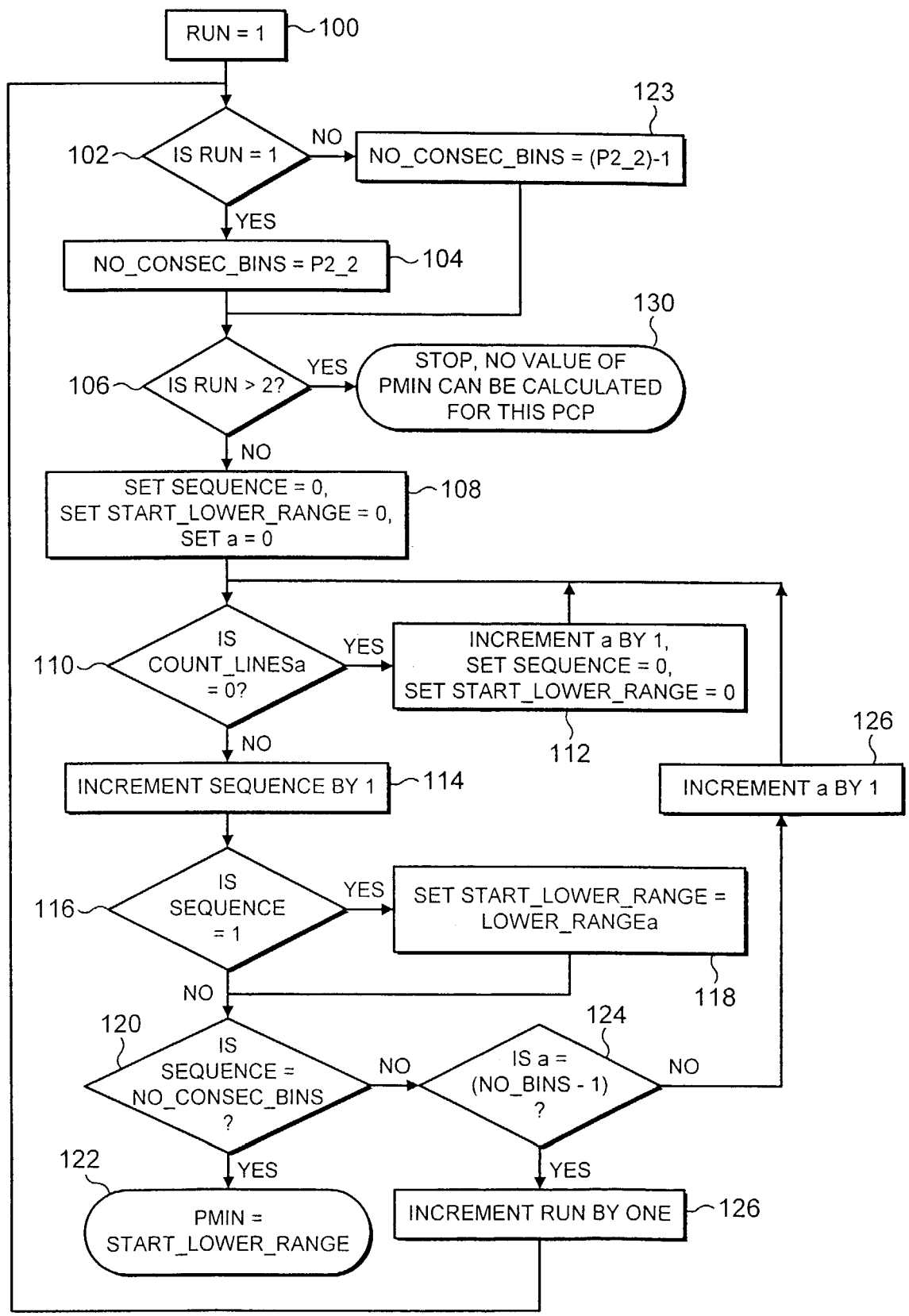
FIG. 3 is a flow chart illustrating the method of obtaining a minimum distribution of healthy reference values for a node according to the present invention.

The method for obtaining the minimum of the distribution of valid healthy references for PCP, $P_{min}$ is shown in FIG. 3. Basically, $P_{min}$ is the numerically lowest lower range value from the numerically lowest set of P2_2 or (P2_2)−1 consecutively filled bins, (i.e. count_lines$_a$ not zero). In a preferred development, $P_{min}$ can be further selected as the lowest capacitance value within the selected bin.

At step 100 a value of run=1 is set. At step 102 the run value is tested and if still 1 the process proceeds to step 104 where the number of consecutive bins no_consec_bins is set to the predetermined value P2_2, for example 5. A further check at 106 is carried out on run and as the value is less than 2 step 108 includes further initializing steps with the following values:

sequence=0
set start_lower_range=0
set a=0

At step 110, if the value of count_lines$_a$ is 0 (that is, the number of lines in a given bin) then at step 112 a (the bin number) is incremented by 1 and sequence and start_lower_range are again set to 0. The process returns to step 110 to establish whether there are any entries in the next bin a+1. The procedure continues until a bin is found with entries in it and at step 114 sequence is implemented by 1. At step 116, if sequence=1 then start_lower_range is set to lower_range a, that is, a first bin value at step 118. On the other hand, if sequence is not 1 then at step 120 the sequence value is tested against no_consec_bins (a predetermined lower limit for the number of adjacent bins).

If the values tally then the bin is identified as step 122 as lower range a. Otherwise, at step 124 the bin number is checked to see if it has reached the upper bin number, a=(no_bins−1). If not, then at step 127 the value of a is incremented and steps 110 to 120 are repeated for the next bin until P2_2 of adjacent populated bins are identified.

If, at step 124, the value of a has reached the upper limit, then the value of run is incremented by 1 and the process returns to step 102. As run does not equal 1 then at step 128, the number of adjacent bins is decremented by 1, no_consec_bins=(P2_2)−1.The process then moves to step 106 and such 106 to 126 are followed once again. If (P2_2)−1 consecutive filled bins are not found (the maximum number having been decremented by 1) then the process returns to 102 once again, but at step 106 the test "is run greater than 2?" is failed and the process stops at 130 as not enough consecutive filled bins can be found.

It will be appreciated that the determination of $P_{min}$ is preferably based on a plurality of values for each line taken over the predetermined period, for example, on healthy lines overnight. In that case, the value can be continually updated to account, for example, for routing changes or other variations. Alternatively, the healthy values can be taken from historical data. Yet further alternatively, the determination can be based on a single measured value for each line with a corresponding reduction in accuracy and foregoing various of the checks for "healthy" reference values.

The reference value that is stored is used in the second part of the operation for assessing the location of a fault as discussed in more detail below. It should be borne in mind that a PCP capacitance reference value obtained as discussed above does not represent the capacitance of a line disconnected at the PCP, but of the healthy lines closest to the PCP. Therefore, the PCP reference is an over-estimate of the capacitance of a line disconnected at the PCP. This over-estimation is corrected for by the method of using the distribution of all historic disconnection faults to diagnose future connection faults as explained in more detail below.

The convention of using the reference $P_{min}$ for the PCP reference obtained from the minimum of the distribution of healthy references will be maintained throughout the description.

The fault location algorithm used in the present invention is created by assuming that the line test characteristics of a set of historic disconnection faults in a particular area can be used to diagnose the final clear-code (the code identifying the fault, given by an engineer dealing with the fault) of faults that occur subsequently in that area. This diagnosis is performed by examining the line test results of the new faults and trying to match them to the distribution observed from the historic disconnection fault measurements.

The information used as input to the selection algorithm is presented diagrammatically in FIGS. 4a and 4b for the cases of a PCP fault and a non-PCP fault, in this example a drop wire fault, at the distribution point (DP)145 respectively. For a particular fault, the difference between the healthy reference capacitance 140 and the fault capacitance 142, 146 for the disconnected leg gives an idea how far the fault is from the customer 144. For PCP faults 142, in many but not all cases, the fault will be far (at least several nf) from the customer 144. As is shown in FIG. 4a, PCP faults will certainly be further from the customer 144 than a drop wire fault or, for that matter, other faults on the d-side of the PCP (cabinet) 146. The differences between the PCP minimum reference $P_{min}$, 148 and the fault reference 142, 146 give an idea how close the fault is to the PCP 146. For many PCP faults 142 this value will be small, provided the e-side cable length of the cable the disconnection fault is on is close to the minimum e-side cable length (whose length is estimated using the minimum of the healthy lines distribution $P_{min}$). In the example shown in FIGS. 4a and 4b, it is clear that the drop wire fault 146 has a capacitance measurement far in excess of the PCP reference 148, whereas the PCP fault measurement 142 is similar to the PCP reference 148. The difference between the capacitance value of the disconnected leg for historic PCP faults, $P_{hist}$ (as determined by faults historically assigned the appropriate fault code), and the fault reference for faults routed through the same PCP 146 also gives an idea how close the fault is to the PCP. As discussed in more detail below this further comparison provides the additional potential for identifying PCP faults 142 occurring on cables other than the shortest e-side cable.

Accordingly, if a new disconnection fault has associated references and measurements that are similar to those of previous PCP disconnection faults and dissimilar to those of previous disconnection faults not cleared at the PCP (ie identified as occurring elsewhere), then it is probable that the new fault is a PCP fault. In the preferred embodiment, the PCP and non-PCP faults are grouped in such a way that the probability of a fault being a PCP fault could be calculated as discussed in more detail below. These probabilities, combined with some simple threshold information, provide the basis for the selection algorithm.

In the preferred embodiment, in order to establish the probability of a particular fault being a PCP fault tables are created. Examples of these are shown in FIG. 5. As discussed in some detail above, a healthy value H for each line is determined and a value $P_{min}$ is also established representing the PCP reference value. Historical disconnection faults in the area are then reviewed to obtain values of F the fault capacitance from the switch/exchange 150 in FIG. 4 to the fault (fault measurement 142, 146 ). As a simple example, for a given line where:

$H-F=5$ nf; and $P_{min}-F=-45$ nf the implication is that the fault is not at the PCP but close to the customer. On the other hand where:

$H-F=52$ nf; and $P_{min}-F=2$ nf then the fault is likely to be close to or at the PCP and distanced from the customer.

As a general rule H–F will generally take a large value if the fault is at the PCP whereas F will be a long way from $P_{min}$ if the fault is non-PCP.

According to the invention, the historical data for F is compared for each line according to these two rules and the table of FIG. 5a shows the results sorted into bins with ($P_{min}$–F) on one axis 160 and (H–F) on the other axis 162. Sample A shows a disconnection close to the customer whilst reference point B shows a disconnection close to the PCP. Multiple values are presented on the table and sorted into bins.

Carrying out this information for a large number of faults provides a table in which predictions can be made in relation to new faults. As new faults arrive their coordinates are determined and mapped onto the table of FIG. 5a. From this the probability of the fault being a PCP fault can be determined based on the clusters previously identified. As a result, based on predetermined probability parameters, a decision can be made as to whether the fault occurs at the PCP or distant from the PCP. This reduces the likelihood of the engineer being dispatched to the wrong location, rendering the maintenance operation more efficient. If will be appreciated that separate tables may be needed for results from exchanges in similar physical/geographical areas as the physical distribution of PCPs and customers can vary considerably between, for example, urban areas and rural areas.

Preferably a second table is also compiled as shown in FIG. 5b. In order to compile this second table a further value $P_{hist}$ is required. As discussed above, $P_{hist}$ is a historical value of the PCP capacitance (for example taken from a line known to be disconnected at the PCP). It will be appreciated that a range of such value are available, for example, because of differences in routing or temporal changes. The value of $P_{hist}$ closest to F is in fact selected and the axes thus comprise abs ($P_{hist}$–F) at 164 and, once again, (H–F) at 166 in FIG. 5b. Selecting the value of $P_{hist}$ closest to the fault value F is based on the assumption that the fault is either on the same e-side cable as that for which $P_{hist}$ was measured, or a cable of similar length.

Multiple values are shown plotted on the table of FIG. 5b, allowing a cluster around results similar to those of type a and b respectively in FIG. 5a. The table of FIG 5a is referred to as a PCP reference table and the table of FIG. 5b is referred to as a historic reference table. The manner in which bins are determined and the probability of the nature of the fault is established and is discussed in more detail below.

These tables provide a method where the distribution of all disconnected faults and PCP disconnection faults can be examined. Also, the use of such tables ensures that the location algorithm (discussed below) is best suited to the area in which the trial is to be conducted (as the information used to build up the table is from that area). The method also side steps the problem that the $P_{min}$ is an overestimate of the actual exchange to PCP reference for the shortest e-side cable feeding the cabinet. This is because the table concerned is populated in such a way that the offset introduced by the overestimation simply shifts the distribution by some value along the $P_{min}$-F axis. However, it should be noted that the amount by which the minimum of the distribution of healthy references overestimates the exchange to PCP capacitance reference will vary from PCP to PCP in the present invention is assumed that this variation is negligible.

Turning now to the construction of the tables and their dimensions, the PCP reference table (FIG. 5a) is created such that the (H–F) capacitance range covers all the values that might be formed. As a result, the lowest bin on this "axis" of the table range from −2000 nf to −10.5 nf, where −2000 nf is an arbitrary large negative number. The table then has "useful" bins on this axis that are 1 nf wide whose lower range values increment by 1 nf from −10.5 nf to 79.5 nf. The final bin range in the healthy reference minus fault measurement capacitance direction extends from 80.5 nf to 2000 nf, where 2000 nf is another arbitrary large number. The data bins into which the disconnection faults are sorted are formed by also subdividing the $P_{min}$-F capacitance range. In this case the lowest value bin extends from −2000 nf to −50.5 nf, where −2000 nf is again an arbitrary large negative number. The table then has "useful" bins 1 nf wide whose lower range values increments by 1 nf from −50.5 nf to 49.5 nf. The final range in the $P_{min}$-F capacitance directed extends from 50.5 nf to 2000 nf, again 200 nf being an arbitrary figure. Hence a series of data bins is created, the "outer" bins being very wide, the "inner" bins being 1 nf wide in the H–F direction and 1 nf wide in the $P_{min}$-F direction. The vast majority of faults would be sorted into the "inner" bins.

The historic PCP reference table (FIG. 5b) uses the same (H–F) range and divisions as used in the PCP reference table. The ($P_{hist}$-F) capacitance range is 0 nf to 0.5 nf. The table then has ($P_{hist}$-F) capacitance bins of 1 nf width whose lower ranges increment in steps of 1 nf from 0.5 nf to 49 nf. The last bin in this direction ranges from 50.5 nf to 2000 nf, where 2000 nf is a large arbitrary value. The bin ranges are selected so that the majority of faults are in bins that were 1 nf wide, whilst keeping the overall table size as small as possible. The algorithm to compile these tables are discussed subsequently in relation to Table 10 from which it will be seen that the various values discussed above for example maximum and minimum bin values, bin width and so forth are individually configurable by associating desired values with each available parameter. It will be appreciated that throughout the specification the values given for the tables are exemplary only and can be replaced by any other appropriate values.

Each of the tables created is basically an array upon which any fault can be placed according to its electrical characteristics (the historic reference table may not include all faults as not every fault necessarily has a previous PCP fault on the PCP through which the line was routed). Each bin in the tables preferably has two fields associated with it, one to hold the total number of faults with the electrical characteristics in the range of the particular table bin, the other to hold the number of these total faults that were cleared (ie identified at) the PCP. It should be noted that faults that are duplicate reports or "faults-not-found" are not used in populating the probability tables (as in the latter case as no information as to the position of the fault in the access network can be extracted from such clear-code information).

Figure 6A:
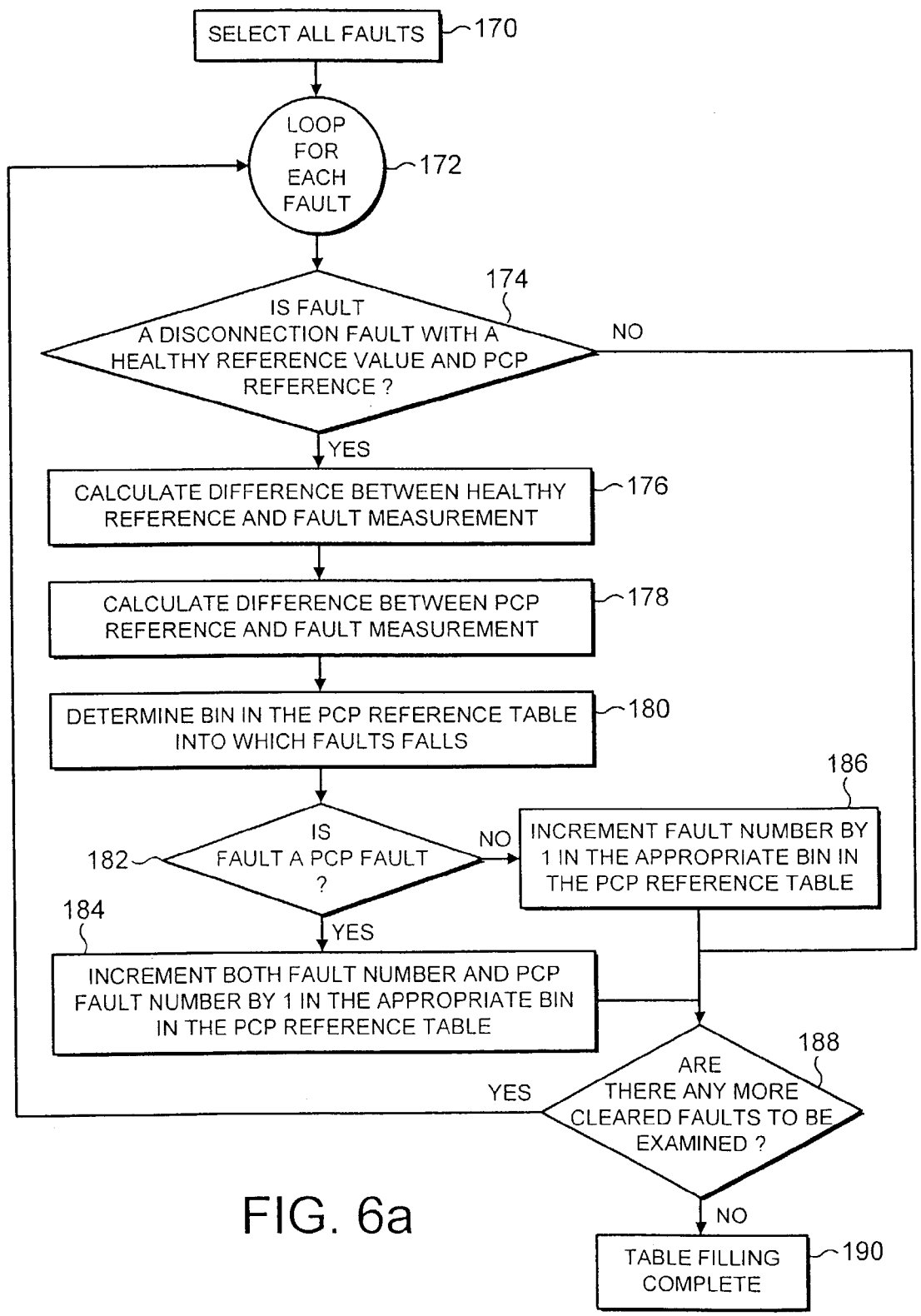
FIG. 6A is a flow diagram showing the population of a histogram for a PCP reference table.
Figure 6B:
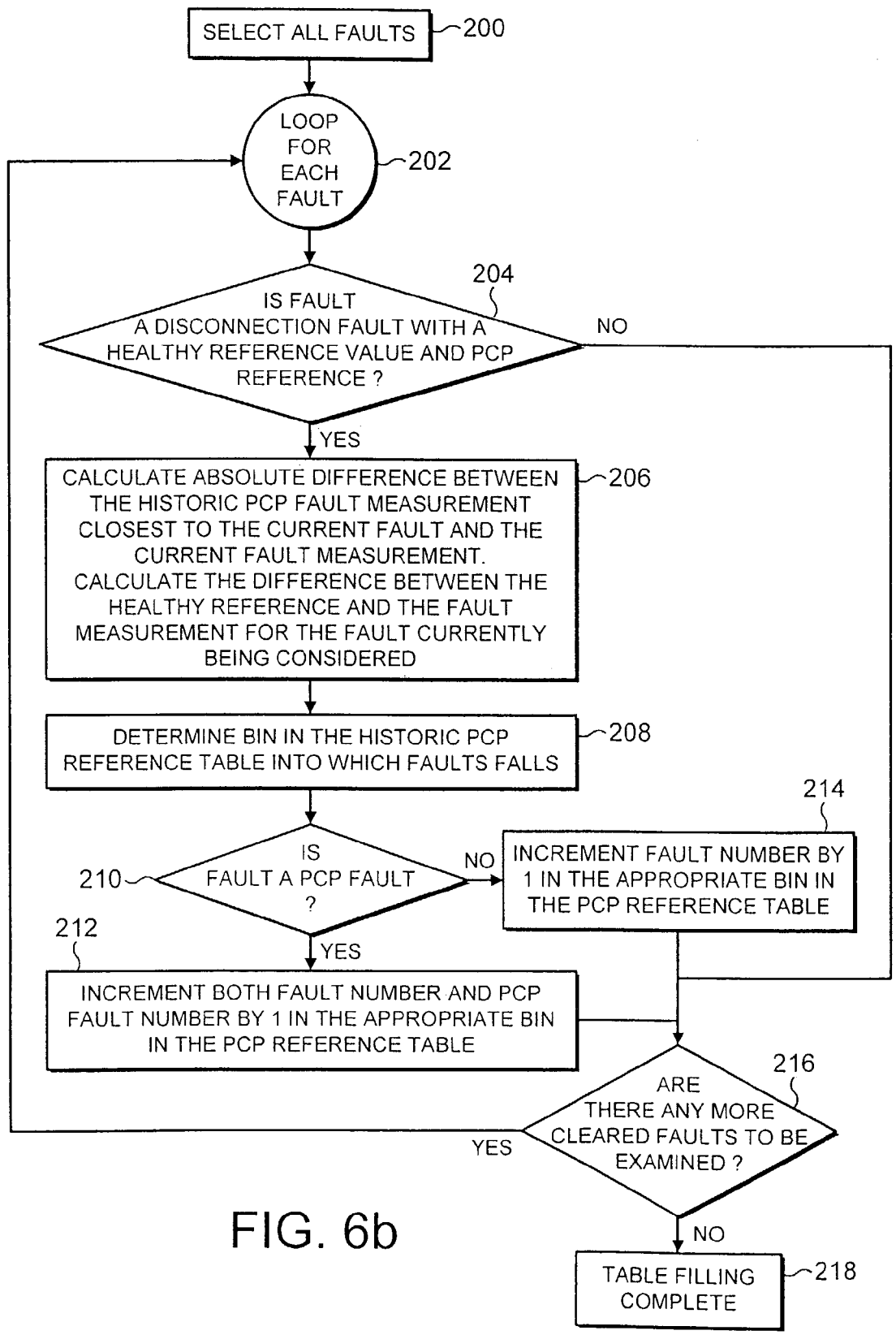
FIG. 6B is a flow diagram showing the population of a historic PCP reference table.

The method used to populate the two probability tables is detailed in the flow charts shown in FIGS. 6a and 6b.

Referring firstly to FIG. 6a, at step 170 all faults are selected and a loop for each fault is set up at step 172. At step 174, if the fault is a disconnection fault with a healthy reference value H and PCP reference $P_{min}$ then at step 176 the difference (H–F) is calculated, at step 178 the difference ($P_{min}$-F) is calculated and at step 180 the relevant bin in the PCP reference table into which the fault falls is determined. At step 182 if the fault is a PCP fault (as determined by the engineer at the time of monitoring the fault and indicated by the fault code) then, in the selected bin, both the fault number and the PCP fault number is incremented by one at step 184. Otherwise the fault number alone is incremented at step 186. Decision box 188 repeats the loop until no more cleared faults require examining at which point table filling is completed at step 190. Accordingly a PCP reference table is formed in which each bin includes the valued both total faults and recorded PCP faults.

Turning now to FIG. 6b, a similar series of steps is followed for a historic PCP reference table. At step 200 all faults are selected and a loop for each fault is instituted at step 202. At step 204 it is established whether the fault is a disconnection fault or is a value H and also whether any PCP faults have occurred on the relevant PCP (as otherwise a value $P_{hist}$ cannot be determined). If these conditions are met that at step 206 ($P_{hist}$-F) and (H–F) are calculated and the relevant bin on the table is determined at step 208. At step 210, if the fault is a PCP fault then the both the fault number and PCP fault number are incremented in the bin by one at step 212. Otherwise only the fault number is incremented at step 214. The loop is repeated at step 216 and once all cleared faults have been examined table filling is complete at step 218.

The pair of fields in each bin is provided in order to allow calculation of the probability of a given fault being a PCP fault. In particular if a detected fault falls in a given bin then the probability of that fault being a PCP fault can be determined from the historical data in that bin and in particular by dividing the number of historic PCP faults in the bin by the total number of faults in the bin. However, this is based on the hypothetical position that each bin contains a representative sample of faults but in practice some table bins may include only a very small number of faults as a result of which the probability calculation may not be accurate.

For instance in one bin there may be only two PCP faults, whereas in an adjacent bin there may be five faults, of which only one was cleared in (ie identified at) the PCP. It is unlikely that the probability of a fault being a PCP fault would change dramatically from one bin to an adjacent bin, hence the source of large differences in probability from bin to bin lays in the low number of faults being considered.

In such instances a threshold value for the number of faults is required for the probability obtained from the table. In order to obtain the required number, the bins on the tables are "expanded" in the H–F direction. This is done by Examining the initial table bin to see if a total of a predetermined number, for example 10 faults were present. If there are less than the predetermined number of faults present examining the two adjacent bins in the H–F direction. Repeating the procedure of examining the next two adjacent bins was repeated until either 10 faults are present or the entire range of H–F had been examined.

The sum of the PCP faults over the range of bins considered divided by the sum of the total faults over the same range is then taken as the probability of the faults being a PCP fault. The reason why the bins are only extended in H–F direction is that the separation between the fault measurement and PCP reference is more important in deciding if a fault is at the PCP than how far the fault is back from the customer, irrespective of the method used to assess the PCP reference.

Figure 7:
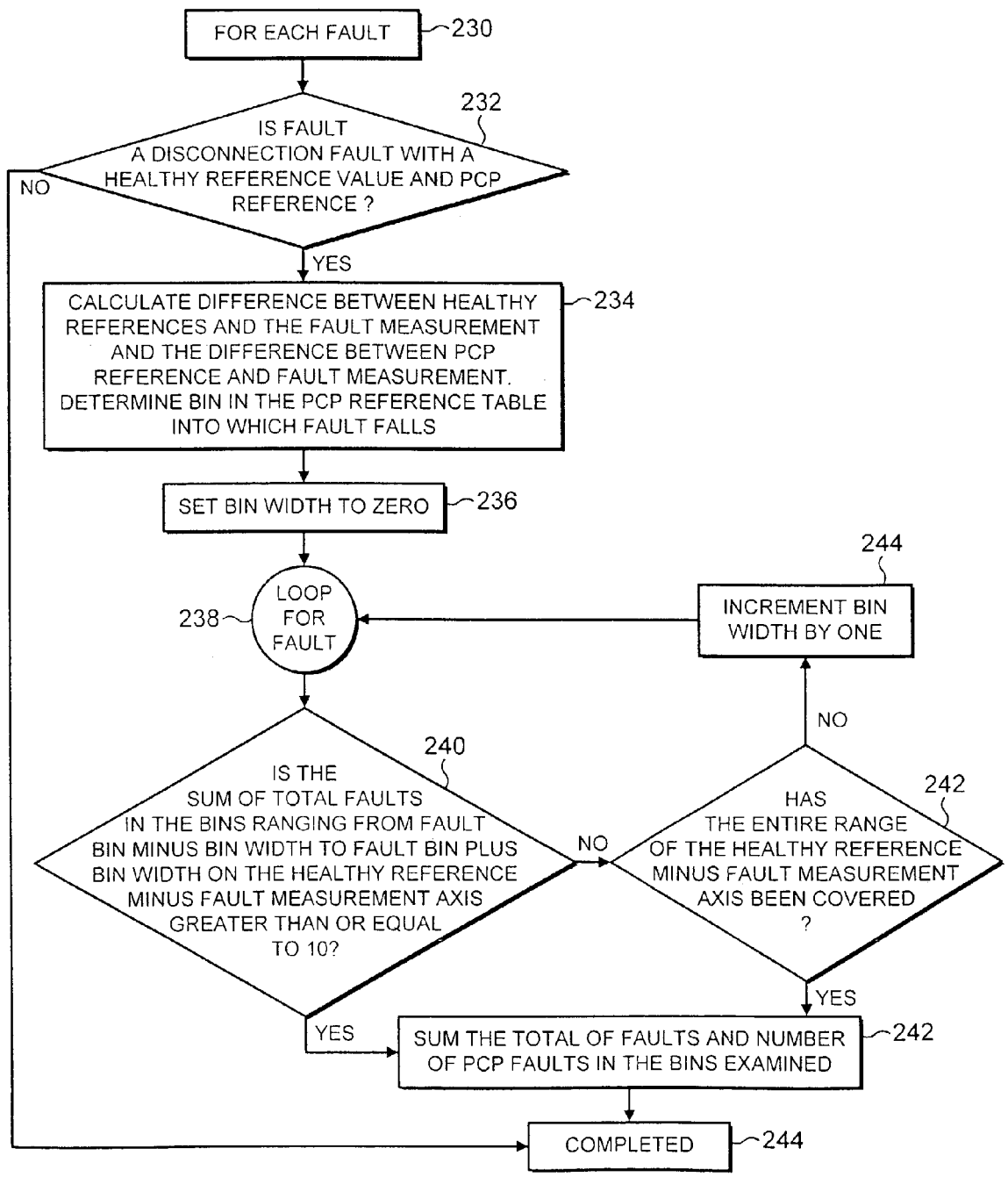
FIG. 7 is a flow diagram showing the calculation of probability of a PCP fault.

The flow chart in FIG. 7 provides a diagrammatic representation of the method used to calculate the probability from the PCP reference table. The method used to get the probability from the historic PCP table is broadly similar and will not be repeated here as it will be entirely apparent to the skilled person.

At step 230 the process is commenced for each fault. At step 232, if a fault is a disconnection fault with values H and $P_{min}$ then at step 234 (H–F) and ($P_{min}$ –F) are calculated to determine the relevant bin on the PCP reference table. At step 236 the bin width is initially set to 0 and a loop set up for each fault at step 238. At 240 the total number of faults in the determined bin is compared to the pre-determined value, for example 10 (as the bin width is set to 0, the bins either side are not assessed). If the number exceeds the predetermined value then at step 242 the total number of faults and total number of PCP faults are summed allowing the probability determination to be carried out by simple division. If in step 240 the total fault number does not exceed the predetermined value then, unless the entire range of H–F has been covered, the bin width is incremented by one at step 244 and the assessment at step 240 is repeated until the total number of faults exceeds the predetermined value. As a result a representative sample on the basis of which a probability calculation can be completed is obtained by incrementing the bin width until sufficient total faults are captured. The operation is terminated at step 244 if a probability determination can be made or if the basic values cannot be ascertained at step 232. Again, the various values discussed above are individually configurable by setting respective parameter values within the controlling algorithm as discussed below in relation to Table 11.

The selection algorithm is developed using the same set of faults as were used to build up the PCP reference and the historic PCP tables together with a live fault measurement value, the relevant bin for which is determined by its H–F and P–F values. The PCP fault probabilities are extracted from the tables as described above, however, the "live" fault itself is preferably removed from the probabilities by subtracting one from the total number of faults and if the fault is a PCP fault, the number of PCP faults is also decremented by one. This method ensures that the results forming the tables for each individual live fault are not influenced by the fault itself and allows a large set of faults to be used in establishing the form of the selection algorithm. In the preferred example the algorithm is developed to ensure that as many PCP faults are acted on as possible whilst ensuring that the accuracy (defined as the number of PCP faults acted on divided by the total number of faults acted on) does not fall below some selected accuracy, for example 70%.

When a fault is examined (ie a "live fault"), the characteristics of the fault (the healthy reference, the fault measurement, the PCP reference and the historic PCP fault measurement closest to the fault measurement) are recorded along with the associated fault number. As well as the characteristics, the number of PCP faults, total faults and number of bins examined for each of the probability tables are also recorded for each fault (if there were no previous PCP faults then the fields associated with this parameter are left empty). The "selection algorithm" to decide if a fault is a PCP fault then examines both the fault probabilities and characteristics. This combination of probabilities and characteristics is required due to the problems associated with probabilities obtained when the bins spread over a large range of H–F, which occur when faults fall in areas of the table where there were few historic faults. The examination of the fault characteristics provides a method whereby the accuracy of the probabilities obtained for a particular fault could be assessed. For example, a fault may have occurred very close to the customer (low chance of being PCP fault), but due to a low number of faults in that part of the table, the probability returned is calculated from many faults that had occurred far from their associated customers (that have a greater chance of being PCP faults). In this case, the "high" probability of a fault being a PCP fault can be ignored on the strength of the argument that a fault very close to a customer is unlikely to be a PCP fault.

The selection algorithm for determining probability is composed of two sections. The first examines the probability from the PCP reference table (FIG. 5a), requiring in the preferred example that the probability be greater than some selected probability, for example 70% for the fault to be acted on. The second examines the combined probability from the PCP reference (FIG. 5a) and the historic PCP (FIG. 5B) tables, requiring that the combined probability be greater than some selected probability, for example 70%. As a result inaccuracies in the historic PCP table preferably arising because the e-side cable for the selected historic PCP fault $P_{hist}$ was not always on the same e-side cable as the fault itself are investigated. Because of these inaccuracies the historic PCP faults had, in some cases, characteristics similar to non-PCP faults on shorter e-side cables.

According to the algorithm, and dependent on the PCP selected, there are various thresholds that must be adhered to in order for a fault to be acted upon.

(a) The total number of faults in the expanded bin must exceed one. Ideally there should be at least some predetermined number of faults when calculating the probability as discussed above. However, where there is a small number of faults in parts of the table, the situation could arise where there was only one fault, which is a PCP fault, in the H–F column in either the PCP reference or historic reference tables. If such cases were considered then all future faults with the same H–F value would be diagnosed as PCP faults (until the table is re-populated). Increasing this value for the number of faults being considered when calculating the probability significantly reduces the number of faults acted on.

(b) The fault measurement must be less than the healthy measurement.

(c) F must be greater than or equal to, for example, $0.6 \times P_{min}$, to remove exchange faults.

(d) F must be less than or equal to, for example, $1.75 \times P_{min}$, to remove the influence of incorrectly cleared faults and PCP faults for lines on e-side cables other than the e-side cable through which the fault being tested was routed.

Having looked at the general operation of this aspect of the invention we now consider in more detail the algorithm's operation involved in compiling the histogram and assessing the relevant probabilities.

Table 7 defines a set of user definable parameters and suggested values for the preparation of historical fault data as part of the algorithms.

| Parameter Code | Parameter description | Units | Possible range to set parameter | Suggested value |
|---|---|---|---|---|
| P3_1 | Minimum number of weeks of fault data required | — | 10 or more | 10 or more |
| P3_2 | Minimum fault resistance threshold for A leg to Earth | Ohms | 0 to 999999 | P1_4 |
| P3_3 | Minimum fault resistance threshold for B leg to Earth | Ohms | 0 to 999999 | P1_7 |
| P3_4 | Minimum fault resistance threshold for A leg to B leg | Ohms | 0 to 999999 | P1_3 |
| P3_5 | Minimum fault resistance threshold for B to battery | Ohms | 0 to 999999 | P1_8 |
| P3_6 | Minimum fault resistance threshold for B leg to A leg | Ohms | 0 to 999999 | P1_6 |
| P3_7 | Minimum fault resistance threshold for A leg to battery | Ohms | 0 to 999999 | P1_5 |
| P3_8 | Disconnection fault, loop upper threshold value | — | Greater than 0 to 1 | IF Vanderhoff THEN P3_8 = 0.5 IF Teradyne THEN P3_8 = 1.0 |
| P3_9 | Disconnection fault, loop lower threshold value | — | 0 to 1 | IF Vanderhoff THEN P3_9 = 0.0 IF Teradyne THEN P3_9 = 0.0 |

Table 8 provides the various codes and descriptions for fault information for the areas being investigated.

| Code | Name | Description |
|---|---|---|
| F_FN | FAULT_NUMBER | CSS fault reference code |
| F_CIRC | CIRCUIT_ID | Identifies the line |
| F_CCODE | CLEAR_CODE | CSS clear code) note, this is not a number) |

Table 9 sets out the relevant codes and descriptions for associated line test information of each fault.

| Code | Name | Description |
|---|---|---|
| T_FN | FAULT_NUMBER | CSS fault reference code |
| T_CIRC | CIRCUIT_ID | Identifies the line |
| T_SEQ | SEQUENCE_NUMBER | Number of the line test done |
| T_RESAE | RES_A_ETH | Resistance value, used to check line |
| T_RESBE | RES_B_ETH | Resistance value, used to check line |
| T_RESAB | RES_A_B | Resistance value, used to check line |
| T_RESBBAT | RES_B_BATT | Resistance value, used to check line |
| T_RESBA | RES_B_A | Resistance value, used to check line |
| T_RESABAT | RES_A_BATT | Resistance value, used to check line |
| T_TERM | LINE_TERM_FOUND | Test system response, Y or N |

-continued

| Code | Name | Description |
|---|---|---|
| T_CAPBE | CAP_B_ETH | Capacitance, B leg to Earth |
| T_CAPAE | CAP_A_ETH | Capacitance, A leg to Earth |
| T_CAPLOOP | CAP_B_A | Capacitance, loop |

Tables 8 and 9 are based on conventionally used data fields.

Fault data with associated line test information is obtained for a time period defined by P3_1. The period is dependent on a number of lines being considered in order to ensure that a suitable population of data is obtained. For example for 100,000 lines a 13 week period may be appropriate. For each fault the directory number is obtained from CIRCUIT_ID. A particular embodiment of the system for locating faults is dependent on the system used for testing, if healthy data is available for only one circuit on a directory number, then all the circuits on that are assumed to have the same H value. As a result any fault on a multi-line installation uses the H value for the circuit for which data is available. If additional routine data is available then the system can accommodate this, for example, by creating H values for each circuit and comparing fault data for that circuit with the associated H value.

It will be noted that any faults on lines having an associated H value and a $P_{min}$ value for the relevant PCP are considered. In the present system measurements are examined where T_SEQ=1 such that only the first test on the fault is considered to obtain a single set of measurements for the fault (an average of all the test measurements for the fault could possible be used). For multi-line installation it is assumed that the first test is on the circuit on which the fault has been reported.

Various further requirements are introduced to restrict the faults that are considered. Once again the tests are conducted on lines which do not have any resistance values less than some predetermined value, for example 1 MΩ. As can be seen the various possible resistance values for each leg and between the legs and earth are all checked. Of these lines, disconnection faults are taken as being those with a loop capacitance value less than or equal to P3_8×minimum of the A or B leg to earth capacitance values and greater than or equal to P3_9×minimum A or B leg to earth capacitance (the value of P3_8 is dependent on the test system; where the Vanderhof test systems used the value of P3_8 is 0.5) and where the line system has not detected a termination. This is demonstrated by the following conditions:

T_RESAE>P3_2

AND T_RESBE>P3_3

AND T_RESAB>P3_4

AND T_RESABAT>P3_5

AND T_RESAB>P3_6

AND T_RESABAT>P3_7

AND (T_CAPLOOP<=P3_8×Minimum (T_CAPAE,T_CAPBE) AND T_CAPLOOP>=P3_9×Minimum (T_CAPAE,T_CAPBE) AND T_TERM=N).

The fault measurement is taken as the minimum of the A or B leg to earth capacitance value. As a result, and as discussed above, only balanced lines are considered to assist in the selection of the minimum value. Only faults upon balanced lines are considered as the method of taking the minimum leg to earth capacitance value for the fault measurement would not work if the line was severely imbalanced (as the leg with the minimum capacitance value may not be the leg upon which disconnection has occurred). Once again, the fault measurement is referred to as F, and can be determined as follows:

F=Minimum (T_CAPAE,T_CAPBE).

The fault is also disregarded if F_CCODE is one of various predetermined codes indicating exceptional circumstances beyond the scope of the system. Any remaining faults are labelled as either a PCP or a non-PCP fault, the fault code indicating any PCP fault.

A list of historic PCP faults is thus compiled where the PCP historic fault reference $P_{ref}$ is taken as F, ie $P_{ref}=F$.

Accordingly a reference value is stored for PCP faults on each line and in addition routing, R information for the associated lines is also stored. All remaining faults are non-PCP faults, by definition, Turning now to the probability table that is compiled, table 10 shows user definable parameters and suggested values for the probability table fill in. These are domain parameters, each region having an individual set of such parameters.

| Parameter code | Parameter description | Units | Possible range to set parameter | Suggested value |
|---|---|---|---|---|
| P4_1 | PCP reference table H-F start value | Nano Farads | Minus infinity to less than P4_2 | −2000 |
| P4_2 | PCP reference table H-F lower "bin width" range value | Nano Farads | Greater than P4_1 | −10.5 |
| P4_3 | PCP reference table H-F bin width value | Nano Farads | (Greater than 0) to 10 | 1 |
| P4_4 | PCP reference table H-F higher "bin width" range value | Nano Farads | P4_2 plus some positive, non-zero, integer multiple of P4_3 | 80.5 |
| P4_5 | PCP reference table H-F end value | Nano Farads | (Greater than P4_4) to infinity | 2000 |
| P4_6 | PCP reference table Pmin-F start value | Nano Farads | Minus infinity to less than P4_7 | −2000 |
| P4_7 | PCP reference table Pmin-F lower "bin width" range value | Nano Farads | Greater than 4_6 | −50.5 |
| P4_8 | PCP reference table Pmin-F bin width value | Nano Farads | (Greater than 0) to 10 | 1 |
| P4_9 | PCP reference table Pmin-F higher "bin width" range value | Nano Farads | P4_7 plus some positive, non-zero, integer multiple of P4_8 | 50.5 |
| P4_10 | PCP reference table Pmin-F end value | Nano Farads | (Greater than P4_9) to infinity | 2000 |
| P4_11 | PCP historic fault table H-F start value | Nano Farads | Minus infinity to less than P4-12 | −2000 |
| P4_12 | PCP historic fault table H-F lower "bin width" range value | Nano Farads | Greater than P4_11 | −10.5 |
| P4_13 | PCP historic fault table H-F bin width value | Nano Farads | (Greater than 0) to 10 | 1 |
| P4_14 | PCP historic fault table H-F higher "bin width" range value | Nano Farads | P4_12 plus some positive, non-zero, integer multiple of P4_13 | 80.5 |
| P4_15 | PCP historic fault table H-F end value | Nano Farads | (Greater than P4_14) to infinity | 2000 |
| P4_16 | PCP historic fault table Rhist lower "bin width" range value | Nano Farads | Greater than 0 | 0.5 |
| P4_17 | PCP historic fault table Rhist bin width value | Nano Farads | (Greater than 0) to 10 | 1 |
| P4_18 | PCP historic fault table Rhist higher "bin width" range value | Nano Farads | P4_16 plus some positive, non-zero, integer multiple of P4_17 | 50.5 |
| P4_19 | PCP historic fault table Rhist end value | Nano Farads | (Greater than P4_18) to infinity | 2000 |

As discussed in more detail below tables are constructed allowing the probability of a fault being a PCP fault to be estimated. Bearing in mind geographical/physical differences between networks in different regions, several sets of tables may be required to accommodate this. In addition different line test system types (for example Vanderhoff or Teradyne) will give rise to different test results and also need to be accommodated in different tables.

As discussed above, a PCP reference table (PR table) is created having the axes H–F and $P_{min}$ –F. The H–F axis ranges are defined between two outer limits P4_1 and P4_5. A "useful" bin range is defined by inner parameters P4_2 and P4_4, and the bin width within that range is defined by P4_3. This is expressed as follows:

$H-F>=P4\_1$ to $H-F<P4\_2$ $H-F>=P4\_2+b(P4\_3)$ to $H-F<P4\_2+(b+1)(P4\_3)$ $H-F>=P4\_4$ to $H-F<P4\_5$.

where b is an integer ranging from 0 to (((P4_4_P4_2)/P4_3))−1).

In relation to the $P_{min}$ –F axis, outer limits are defined by P4_6 and P4_10, inner, useful limits are defined by P4_7 and P4_9 and a useful bin width is defined by P4_8, expressed as follows:

$P_{min}-F>=P4\_6$ to $P_{min}-F<P4\_7$ $P_{min}-F>=P4\_7+c(P4\_8)$ to $P_{min}-F<P4\_7+(c+1)(P4\_8)$ $P_{min}-F>=P4\_9$ to $P_{min}-F<P4\_10$.

where c is an integer ranging from 0 to (((P4_9−D4_7)/P4_8))−1).

As discussed above two values are associated with each bin, the total number of faults (PR_T) and the total number of PCP faults (PR_P). These are defined as follows:

PR_T=number of PCP faults and Non-PCP faults whose H–F and $P_{min}$–F values are within the bin ranges PR_P=number of PCP faults whose H–F and $P_{min}$–F values are within the bin ranges.

The PR table is compiled from these values.

Turning now to the PCP historic reference table (PH), the axes as discussed above are (H–F) and $R_{hist}$, are $_{hist}R_{hist}$ is (based on $P_{hist}$–F) in the following manner:

$$R_{hist} = \text{minimum}_{r=l}^{r=k}(\text{absolute}(Pref_r - F))$$

where r is an integer and k is the number of Pref values that are present for the PCP associated with a fault being considered, excluding the fault under consideration if that is a PCP fault. Note that $R_{hist}$ can not be calculated if there has not been an historic PCP fault on the PCP associated with the fault. In this case the fault is not entered into the PH table.

The axis range for H–F has a lower limit P4_11 and an upper limit P4_15, inner useful limits P4_12 and P4_14 and a bin width in the useful range defined by P4_13, as expressed as follows:

$H-F>=P4\_11$ to $H-F<P4\_12$ $H-F>=P4\_12+d(P4\_13)$ to $H-F<P4\_12+d+1)$ $(P4\_13)$ $H-F>=P4\_14$ to $H-F<P4\_15$ where d is an integer ranging from 0 to (((P4_14−P4_12)/P4_13))−1).

The $R_{hist}$ axis has a lower limit of 0 (as the value is an absolute value), and an upper limit defined by P4_19 in the useful limits defined by P4_16 and P4_18 and a bin width within this useful range defined by P4_17, as can be seen from the following:

$R_{hist}>=0$ to $R_{hist}<P4\_16$ $R_{hist}>=P4\_16+e(P4\_17)$ to $R_{hist}<P4\_16+(e+1)(P4\_17)$ $R_{hist}>=P4\_18$ to $R_{hist}<P4\_19$ Where e is an integer ranging from 0 to (((P4_18−P4_16)/P4_17))−1).

Once again each bin on the PH table has two fields, the total number of faults and the total number of PCP faults, defined as follows:

PH_T=number of PCP faults and Non-PCP faults whose (H–F) and $R_{hist}$ values are within the bin ranges PH_P=number of PCP faults whose (H–F) and $R_{hist}$ values are within the bin ranges.

Figure 8:
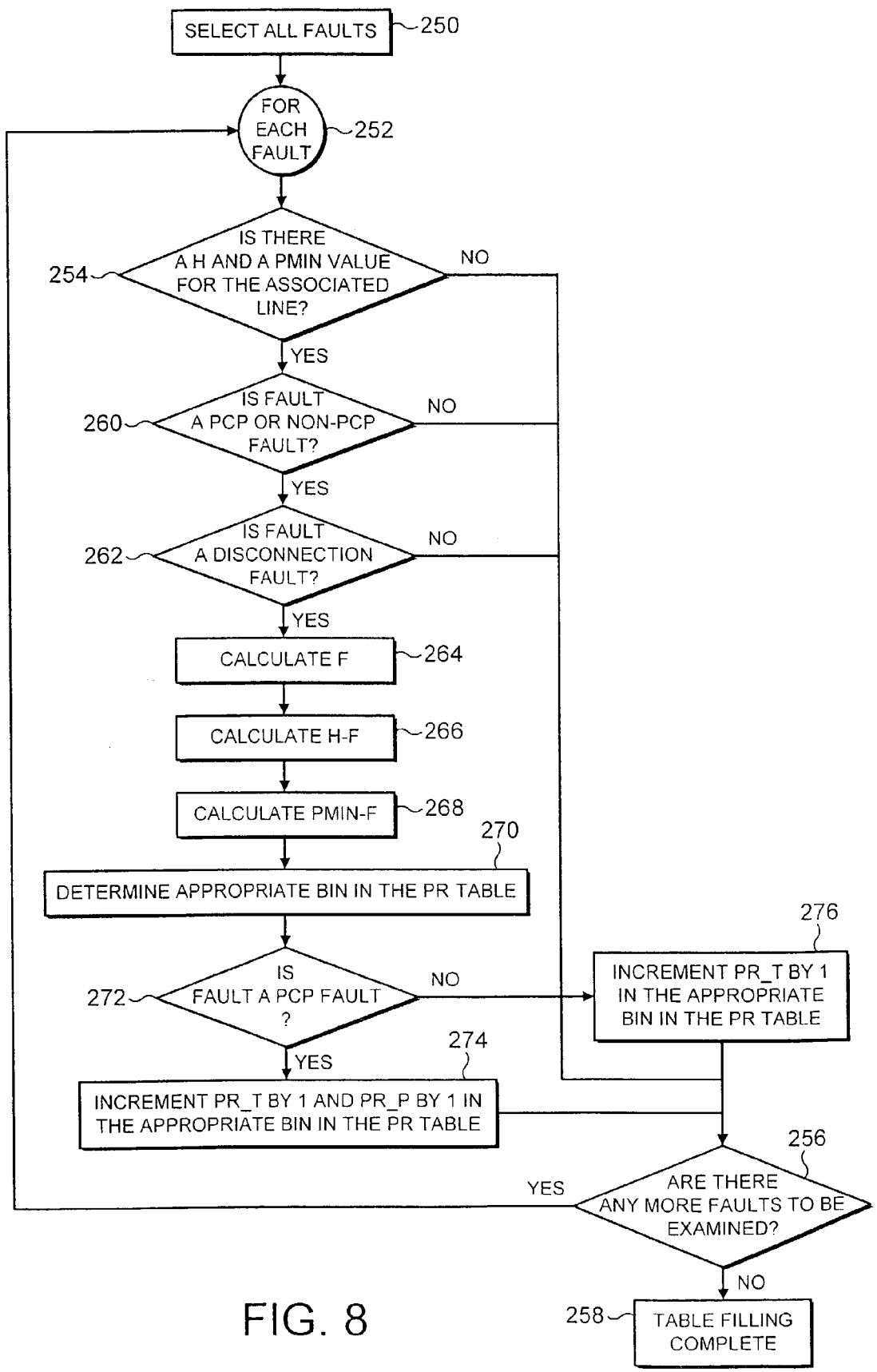
FIG. 8 is a flow diagram for the algorithm for populating a PCP reference table.
Figure 9:
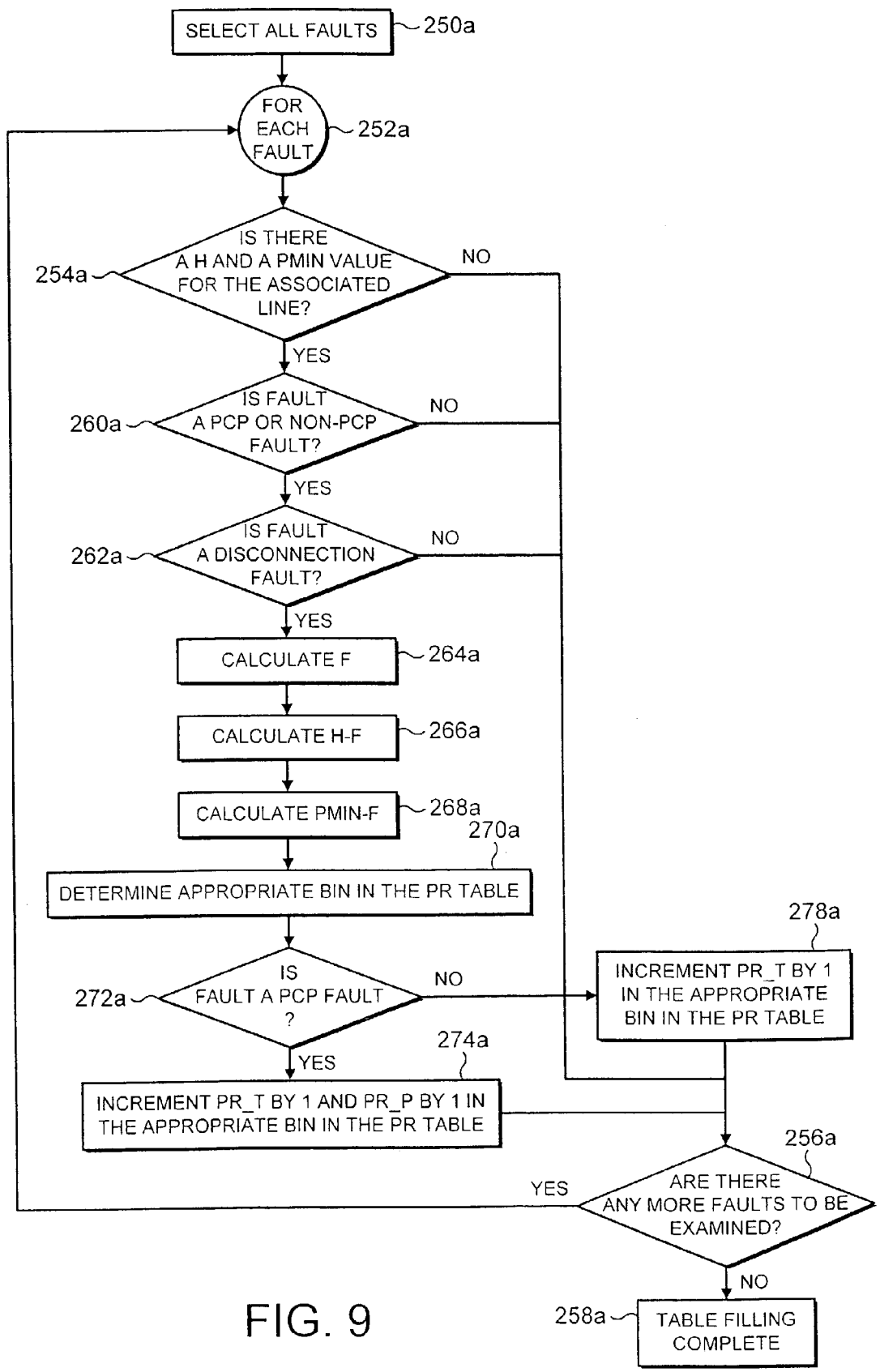
FIG. 9 is a flow diagram showing the algorithm for populating a PCP historic reference table.

Turning to FIGS. 8 and 9 the manner in which the PR and PH tables are filled or compiled respectively can be seen.

Dealing firstly with the PR table (PCP reference table), as shown in FIG. 8 at step 250 all faults are selected and a loop is commenced for each fault at step 252. At step 254, if a line does not have H and $P_{min}$ values then the process jumps to step 256 where the loop is recommenced at 252 for the next fault unless no faults remain in which case at step 258 the process stops. If there are H and $P_{min}$ values then at step 256 a check is carried out to establish that the fault is either a PCP or non-PCP fault (ie not one of the excluded faults discussed above). If not then again the process jumps to step 260 and the loop is repeated for any remaining faults. The process proceeds to step 262 to establish that the fault is a disconnection fault, once again if not then the procedure jumps to the next fault at box 256. Otherwise F, H–F and $P_{min}$–F are calculated at box 264, 266 and 268 respectively. The appropriate bin in the PR table is determined based on the calculations set out above at step 270. At step 272, if the fault is a PCP fault then PR_T (total faults) and PR_P (PCP faults) are each incremented by one in the relevant field of the appropriate bin in the PR table at step 274. If the fault is not a PCP fault then only the PR_T (total faults) is incremented by one in the appropriate bin in the PR table at step 276. The procedure then loops for any remaining faults as determined at box 256.

Compilation of the PH table is roughly equivalent and the steps are similarly numbered other than the addition of suffix a in each case. The only box that requires additional commentary are steps 254a in which case there is an additional check for $P_{ref}$ value, if not then no entry can be made and the procedure loops to the next fault at box 256a.

It should be noted that all the faults for the whole area under consideration are used for the single PR and a single PH table.

We now turn to the "location algorithm" for locating a new or live fault taking into account the use of definable parameters and suggested values for the location algorithm set out in table 11 which one again represents "domain" parameters for a given region or embodiment.

TABLE 11

| Parameter code | Parameter description | Units | Possible range to set parameter | Suggested value |
| --- | --- | --- | --- | --- |
| P5_1 | Close to Customer reference value | Nano Farads | −10 to 20 | 2.5 |
| P5_2 | Lower range of F value used | — | Greater than 0 to less than 1 | 0.6 |
| P5_3 | Upper range of F value used | — | Greater than 1 | 1.75 |
| P5_4 | Minimum number of faults summed over the range of bins | — | 1 or more | 10 |
| P5_5 | Minimum number of faults obtained from the PR table | — | 1 or more | 1 |
| P5_6 | Minimum probability of PCP fault using PR table only | — | Greater than 0 to 1 | 0.7 |
| P5_7 | Minimum number of faults obtained from the PH table | — | 1 or more | 1 |
| P5_8 | Minimum probability of PCP fault using PR and PH tables | — | Greater than 0 to 1 | 0.7 |

When considering a new fault, first of all the 'T' values set out in table 9 are obtained and the fault is disregarded unless there is a H value for the associated line, a $P_{min}$ value for the relevant PCP through which the line is routed, and the fault is a disconnection fault. F, (H–F), ($P_{min}$–F) and ($R_{hist}$) are all calculated as described above, the last value again only being available if there has been a historic PCP fault on the PCP through which the line is routed. The fault is ignored under various additional conditions, if it is too close to the H value (the threshold being defined by P5_1), or if it is too small or large compared to $P_{min}$ (defined by ratios P5_2 and P5_3), expressed as follows:

IF (H−F<P5_1

OR F<P5_2×$P_{min}$

OR F>P5_3×$P_{min}$)

THEN ignore the fault.

Otherwise the relevant bin is identified for the fault and the probability of it being a PCP fault is calculated as discussed above, and is set out in more detail below in the following discussion. In particular the system is arranged to ensure that the probability calculations are based on a suitable statistical population by summing across a number of adjacent bins (identified on the H−F axis by integer numbers h_lower and h_upper in the negative and for the directions respectively) until the threshold population for the total number of faults to obtain a useful population P5_4 is reached or the entire range of bins has been examined. The two values for the total number of faults (sum_PR_T) and total number of PCP faults historically (sum_PR_P) are obtained from the following equations, as discussed with reference to FIG. 10:

$$SUM\_PR\_T = \sum_{g=\_h\_lower}^{g=+h\_upper} PR\_T_g$$

$$SUM\_PR\_P = \sum_{g=\_h\_lower}^{g=+h\_upper} PR\_P_g$$

where $PR\_T_0$ is the PR_T value for the bin identified by the H−F and $P_{min}$−F values calculated for the fault.

Figure 10:
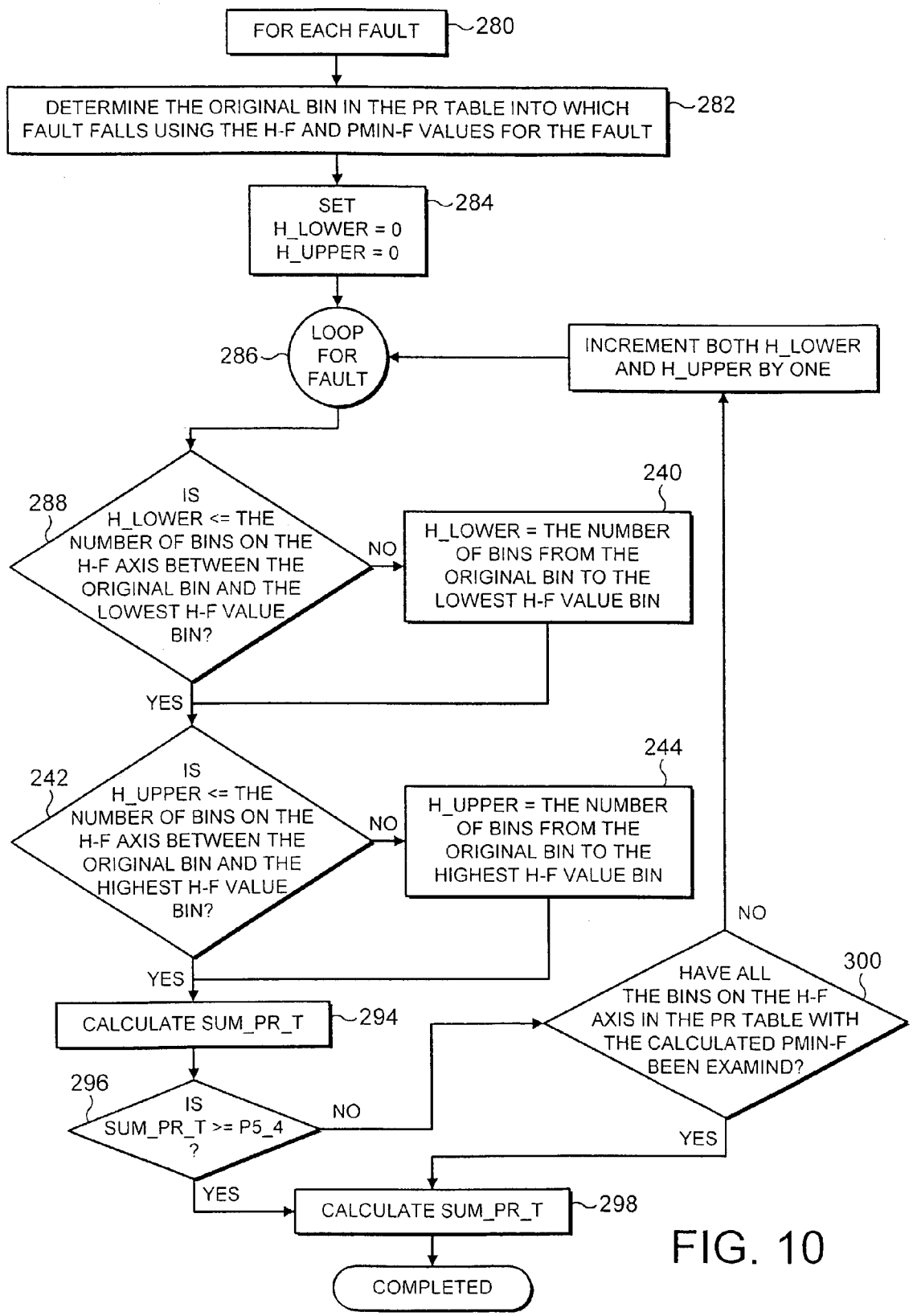
FIG. 10 is a flow diagram showing calculation of a relevant values for probability assessment on the PCP reference table.

Referring to FIG. 10, the process is commenced for each fault at step 280 and, calculating H−F and $P_{min}$−F for each fault the relevant bin of the PR table is determined at 282. At 284 h_lower and h_upper are set to zero and a loop for the fault is commenced at 286. At 288, on the initial run h_lower=0 and hence will be less than or equal to the number of bins on the H−F axis between the bin in which the fault falls and the lowest populated bin and the operation will proceed to step 242 where the value of h_upper will similarly be less than or equal to the number of bins between the selected bin and the highest populated value bin. Accordingly at step 294 the total fault number SUM_PR_T is calculated for that bin and at 296, if that total is greater than the predetermined bin value P5_4, such that a representative sample is obtained, then at step 298 the PCP fault number SUM_PR_P is calculated and the calculation is completed for that fault after which the process can be looped again for the next fault. If at step 296 the total fault number does not exceed the predetermined threshold P5_4 then at step 300, if there are no further bins to examine then the PCP fault number is calculated anyway at step 298. Otherwise h_lower and h_upper are each incremented by one. The checks at 288 and 292 set the value of h_lower and h_upper to a maximum value respectively when effectively one or other ends of the populated bins are reached as a result of which, at step 300, the calculation will terminate.

A similar approach is followed to obtain the nominal values of the PH table (where there has been an historical PCP fault on the relevant PCP) to obtain the equivalent total fault and PCP fault values:

$$SUM\_PH\_T = \sum_{i=\_j\_lower}^{i=+j\_upperi} PH\_T_i$$

$$SUM\_PH\_P = \sum_{i=\_j\_lower}^{i=+j\_upperi} PH\_P_i$$

Once again the j_lower and j_upper values are incremented until the total number of faults exceeds 10.

From the four sum values the probability of a fault being a PCP fault is then determined based on various initial requirements. Those requirements are that the total number of faults summed on the PR table exceeds a minimum value P5_5 and the number of PCP faults summed on the PH table exceeds a proportion of the total summed faults, the proportion being determined by P5_6. Alternatively the total number of faults summed on the PR table needs to exceed the base value P5_5 and the total number of faults summed on the PH table needs to exceed a further threshold defined by P5_7. In that case the ratio of PCP faults to total number of faults in the relevant bin or bins is calculated for each table and compared against a threshold probability set at P5_8, for example 70%. This is represented by the following expressions:

IF (SUM_PR_T>P5_5

AND (SUM_PR_P>=P5_6×SUM_PR_T_))

OR (SUM_PR_T>P5_5

AND

SUM_PH_T>P5_7

AND ((SUM_PR_T×SUM_PH_P)+(SUM_PH_T×SUM_PR_P)−(SUM_PR_P×SUM_PH_P)>=P5_8×(SUM_PR_T×SUM_PH_T))).

It will be seen during the final calculation the threshold is calculated based on the combined possibility of both tables.

Of course, in cases where there are no historical PCP measurements then the algorithm will still work based purely on the PR table.

It is possible that if more faults were added to the two probability tables (ie the probability tables are updated when more fault data becomes available) that the values used in the selection algorithm would need to be modified.

As an alternative to using historically collated data, for example, collated from faults logged in a ten week period, the table can be updated in real time, adding new fault data to the table as it is collected allowing the population of faults in the probability tables to grow over time. In such instance, for each fault various additional information is preferably collected as follows:

Fault number

Clear code (identifying fault type)

Healthy reference from before the time the fault occurred–H

Fault measurement–F

PCP reference used when assessing the fault–$P_{min}$

Routing information for the fault was assessed (zone, exchange, PCP, PCP e-side termination).

The routing at the time of the fault would need to be recorded using the coding described above as currently the fault number is referenced to the phone number upon which the fault occurred and the routing information of this phone number is used as the routing for the fault. In an extended trial or operational system, the routing table would be updated from time to time. As the phone number could be reassigned or the routing altered in light of changes in the network, it is important that the routing of the fault is recorded, as the routing of the associated line may change with time.

Should subsequent recalculations of healthy references on the line occur, and hence the PCP reference values calculated change, the values that were employed at the time of the fault being assessed may be kept. The healthy reference has to be from the time before the fault was cleared in case the routing was altered when the fault was repaired or during other subsequent changes. The PCP reference values may be updated in the light of subsequent recalculation of this value. However, provided the method used to calculate the PCP reference remains unchanged, then the PCP reference calculated at any time represents the best value at that moment. Hence the PCP reference probability table would refer to the best estimates of the PCP reference at the moment the fault was assessed (as opposed to an "actual" PCP reference, which it is not possible to determine exactly using $P_{min}$, the minimum of the healthy reference distribution method).

When a new fault is being assessed, the usual method of determining the fault location is employed.

When the fault is cleared it is then entered in the historic faults table and the probability tables updated. If the clear code of the new fault is "Not PCP", then the probability tables could be updated simply by adding in the new fault.

"PCP" then the information stored for some of the historic faults may have to be altered as some faults may gain a $P_{hist}$ value or the $P_{hist}$ value may change. As a result, the historic reference probability table would have to be updated in light of this new recently cleared fault and any changes for the existing historic faults. The PCP reference probability table could be updated simply by adding in the new fault.

In some areas each line is tested each night to obtain the characteristics of the line at that time so that an up to date healthy reference for each line in the trial can be obtained. The healthy references can be calculated from some predetermined number of recent healthy line test measurements, for example, the last 10 healthy measurements. This method ensures that almost all the lines in the area being tested have a healthy reference value and any changes in the reference value due to lines being re-routed can be captured. In this case, it may be necessary to recalculate the minimum of the healthy reference distribution on a periodic basis to reflect the changes that occur in the healthy reference values.

As more faults are logged it may become possible to build up the distribution of disconnection faults on individual PCPs. Currently the selection algorithm works on tables that are essentially an average of the behaviour of all the PCPs examined. The current method has the great strength that it allows disconnection faults on PCPs without previous PCP faults in the database to be assessed to see if the new fault is a PCP fault. However, the method does assume that the offset between $P_{min}$ and the actual exchange to PCP capacitance reference is the same for all PCPs. This does occasionally lead to some faults being diagnosed as PCP faults when they are on the d-side of the cab (such as faults in the joints underground on the d-side). Individual PCP distributions would allow the offset between $P_{min}$ and the actual exchange to PCP capacitance reference to be assessed for the particular PCP under examination allowing more accurate locations to be diagnosed.

This invention produces a $P_{min}$ an estimate of the minimum exchange to PCP capacitance reference for all the lines routed through the PCP. Alternatively the minimum exchange to PCP capacitance reference can be calculated for sets of lines running through the PCP. The lines are sorted into batches of 100 lines according to the e-side termination number of the line employing this method, a reference for each e-side cable feeding the PCP can be calculated.

Because the operation is based on comparison between $P_{min}$, the healthy line reference, and a measurement of the capacitance of a faulty line, there is no need to work back to the distance values or the capacitance values because of the use of the capacitance values directly. Because the system is based on the PCP locality, the physical location of where the fault stems from is defined meaning that other reference points in the network, be it at the exchange or the customer, are not required.

In the embodiment described the types of fault identified are disconnection faults, that is lines where one or both of the legs have been broken at some point along their length. It will be appreciated, however, that alternative types of faults can be addressed. It will be appreciated that various additions and modifications of the embodiments described are contemplated. Although the discussion includes reference to a minimum of a capacitance distribution, it will be appreciated that the invention can be extended to other parameter measurements from other limit values, such as maximums. Although the discussion is specifically in relation to disconnection faults and to establishing whether a fault is at the PCP, the invention can be extended to other types of fault and other nodes. Although the data is effectively processed in histograms in the embodiments discussed, alternative ways of presenting or processing the data can of course be used. The particular axes implemented in the histograms in the described embodiments are preferable as they allow calculations to be made based purely on the capacitance values without conversion. In addition, by introduction of the $P_{min}$ and $P_{hist}$ values the histogram automatically compensates for the off-set caused by the exchange to PCP capacitance. However, alternative or additional axes can be used based on the various values obtained and, for example, three or more dimensional histograms can be used.

In the embodiments discussed, principally historical data can be used to form the various calculations or alternatively "live" data can be continually added to the various values based on ongoing checks. In that case, the data population can be increased, and accuracy, and up-to-date information dealing with, for example, routing changes can be maintained. For example where a line is identified by a customer telephone number then changes to the telephone number can be accommodated by such a system. The accuracy of the system can be set arbitrarily other than 70% probability as discussed above. Coverage (a proportion of faults picked up) can also be varied although increasing this may increase the number of incorrect fault locations.

What is claimed is:

1. A method of locating faults on a telecommunications network including a switch and a plurality of terminating lines extending from the switch, said method comprising:
   measuring a parameter of a line having a fault to derive a fault line parameter value based on the measured parameter;
   comparing the fault line parameter value against a distribution of historical parameter values associated with location;
   identifying a probable fault location from the comparison; wherein
   (i) the fault line parameter value is compared against a corresponding historical values on the distribution of historical parameter values associated with location; and
   (ii) if a probability represented by a historical distribution location is derived from an unrepresentative sample, the fault line parameter value is further compared against probabilities represented by one or more adjacent locations in the historical distribution of parameter values associated with location.

2. A method as in claim 1 in which each distribution location is representative of the probability of a fault occurring at a predetermined point on the network.

3. A method as in claim 2 in which each distribution location includes the total number of historical faults and the number of historical faults at the predetermined point on the network for the distribution location.

4. A method as in claim 2 in which the distribution is compiled for terminating lines passing through a common node and the predetermined point on the network is the node location.

5. A method as in claim 1 in which the measured parameter is capacitance.

6. A method as claim 1 in which the distribution is a histogram distribution.

7. A method as in claim 3 in which the distribution is compiled for terminating lines passing through a common node and the predetermined point on the network is the node location.

8. A method of locating faults on a telecommunications network including a switch and a plurality of terminating lines extending from the switch, said method comprising:
   measuring a parameter of a line having a fault to derive a fault line parameter value;
   comparing the fault line parameter value against a distribution of historical parameter values; and
   identifying the probable fault location from the comparison;
   wherein
   (a) the distribution comprises at least one axis comprising a comparison of historical fault line parameter values and corresponding historical non-fault line parameter values, and
   (b) the distribution is compiled for terminating lines passing through a common node and comprises a first axis comprising a comparison of historical fault line parameter values and corresponding historical healthy line values, and a second axis comprising a comparison of historical fault line parameter values and a value representative of the switch to node parameter value.

9. A method as in claim 8 in which the fault line parameter value is compared against a further distribution comprising a first axis comprising a comparison of historical fault line parameter values and corresponding healthy line parameter values, and a second axis comprising a comparison of historical fault line parameter values and the historical switch to node parameter value closest to the fault line parameter value.

* * * * *